(12) United States Patent
Benton et al.

(10) Patent No.: US 10,464,021 B2
(45) Date of Patent: Nov. 5, 2019

(54) WATER PURIFICATION SYSTEMS AND METHODS HAVING PRESSURIZED DRAW STREAM

(71) Applicant: Porifera, Inc., San Leandro, CA (US)

(72) Inventors: Charles Benton, Berkeley, CA (US); Erik Desormeaux, Berkeley, CA (US); Olgica Bakajin, Berkeley, CA (US)

(73) Assignee: Porifera, Inc., Hayward, CA (US)

( * ) Notice: Subject to any disclaimer, the term of this patent is extended or adjusted under 35 U.S.C. 154(b) by 0 days.

(21) Appl. No.: 15/752,879

(22) PCT Filed: Aug. 31, 2016

(86) PCT No.: PCT/US2016/049747
§ 371 (c)(1),
(2) Date: Feb. 14, 2018

(87) PCT Pub. No.: WO2017/040696
PCT Pub. Date: Mar. 9, 2017

(65) Prior Publication Data
US 2018/0243693 A1  Aug. 30, 2018

Related U.S. Application Data

(60) Provisional application No. 62/212,506, filed on Aug. 31, 2015.

(51) Int. Cl.
*B01D 61/00* (2006.01)
*C02F 1/44* (2006.01)
(Continued)

(52) U.S. Cl.
CPC ........ *B01D 61/002* (2013.01); *B01D 65/102* (2013.01); *C02F 1/445* (2013.01); *B01D 61/025* (2013.01); *B01D 61/58* (2013.01); *B01D 2311/04* (2013.01); *B01D 2311/06* (2013.01); *B01D 2311/14* (2013.01);
(Continued)

(58) Field of Classification Search
None
See application file for complete search history.

(56) References Cited

U.S. PATENT DOCUMENTS 3,560,152 A * 2/1971 Davison ................ C01B 13/22
423/613
3,707,231 A * 12/1972 Bradley ................ B01D 69/08
210/98

(Continued)

FOREIGN PATENT DOCUMENTS

JP   2000107575 A  *  4/2000
WO  2011164946 A1    12/2011
(Continued)

OTHER PUBLICATIONS

Achilli, Power generation with pressure retarded osmosis: An experimental and theoretical investigation, J. of Membrane Sci., 343(2009), pp. 42-52 (Year: 2009).*

(Continued)

*Primary Examiner* — Chester T Barry
(74) *Attorney, Agent, or Firm* — Dorsey & Whitney LLP

(57) ABSTRACT

Embodiments described herein relate to methods and systems for dewatering solutions via forward osmosis.

21 Claims, 7 Drawing Sheets

(51) Int. Cl.
  *B01D 65/10* (2006.01)
  *C02F 103/08* (2006.01)
  *B01D 61/02* (2006.01)
  *B01D 61/58* (2006.01)

(52) U.S. Cl.
  CPC .... *B01D 2311/246* (2013.01); *B01D 2313/90* (2013.01); *C02F 2103/08* (2013.01); *C02F 2209/02* (2013.01); *C02F 2209/03* (2013.01); *C02F 2209/40* (2013.01)

(56) References Cited

U.S. PATENT DOCUMENTS

| | | | |
|---|---|---|---|
| 7,879,243 | B2 | 2/2011 | Al-Mayahi et al. |
| 8,221,629 | B2 | 7/2012 | Al-Mayahi et al. |
| 9,393,525 | B2* | 7/2016 | Moody ............... B01D 61/002 |
| 9,822,021 | B2* | 11/2017 | McGinnis ........... B01D 61/002 |
| 10,029,212 | B2* | 7/2018 | Marui ................. B01D 61/002 |
| 2010/0024423 | A1 | 2/2010 | McGinnis et al. |
| 2011/0155660 | A1* | 6/2011 | Mickols ............. B01D 61/025 210/500.28 |
| 2012/0111794 | A1* | 5/2012 | Al-Jlil ................ B01D 61/364 210/636 |
| 2012/0267306 | A1 | 10/2012 | McGinnis et al. |
| 2013/0220927 | A1 | 8/2013 | Moody et al. |
| 2013/0319943 | A1* | 12/2013 | Duan .................. B01D 61/002 210/644 |
| 2014/0076728 | A1 | 3/2014 | Prakash et al. |
| 2014/0110328 | A1* | 4/2014 | Doi ......................... F03B 13/00 210/321.66 |
| 2015/0114905 | A1 | 4/2015 | Subbiah et al. |
| 2015/0136676 | A1 | 5/2015 | Helm et al. |
| 2015/0144553 | A1 | 5/2015 | Vogel et al. |
| 2016/0030893 | A1* | 2/2016 | Lind .................. B01D 67/0079 210/650 |
| 2018/0243693 | A1* | 8/2018 | Benton .................. C02F 1/445 |

FOREIGN PATENT DOCUMENTS

| | | |
|---|---|---|
| WO | 2014089142 A1 | 6/2014 |
| WO | 2015087063 A1 | 6/2015 |
| WO | 2017040696 A1 | 3/2017 |

OTHER PUBLICATIONS

Popper, Desalination by Osmosis-Reverse Osmosis Couple, Sciecne, vol. 159, Issue 3821, pp. 1364-1365 (Year: 1968).*
International Search Report and Written Opinion Received for PCT Appl. No. PCT/US2016/049747 dated Jan. 13, 2017.

* cited by examiner

WATER PURIFICATION SYSTEMS AND METHODS HAVING PRESSURIZED DRAW STREAM

CROSS-REFERENCE TO RELATED APPLICATIONS

This application is a 35 U.S.C. § 371 National Stage Application of PCT Application No. PCT/US2016/049747, filed on Aug. 31, 2016, which claims priority to U.S. Provisional Application No. 62/212,506, filed on Aug. 31, 2015. The afore-mentioned applications are incorporated herein, in their entirety, for any purpose.

BACKGROUND

In some areas, existing techniques for purifying waste water for reuse as potable water are limited by government regulations designed to ensure that harmful contaminants are not passed into the potable water supply. Such regulations can require at least a 5-log reduction in contaminants between the wastewater and the potable water. In the United States, some states can require additional barriers between waste and potable waters for certain dissolved contaminants, pathogens and emerging contaminants. For example, in some areas such as California, treated water must be injected into a groundwater basin for years before it can be pumped to the surface and used for potable drinking water. This approach is called Indirect Potable Reuse (IPR) and has also been used by other U.S. states, Australia, and other regulatory bodies, and is the state of the art for wastewater to potable water reuse.

In reverse osmosis (RO) systems, feed and product water conductivity is monitored in real-time using conductivity measurements to confirm that the membranes are removing a certain percentage of salts and this salt removal is used as a surrogate for overall membrane rejection and integrity. Even though this is real-time data, it is at a low resolution compared to what is needed for detecting acceptable levels of contamination or leaks (e.g., pinhole leaks) that may not be detected with currently used techniques for days, months, or years. Typically, if an RO system can remove greater than 99.0% of total salts (e.g., total dissolved solids), then a RO system is permitted for 2-log (99.0%) removal of pathogens and viruses. Consequently, one or more RO membrane elements in a RO system containing any number of RO membrane elements can have integrity issues that allow virus and pathogens to pass through the RO membrane via a small leak that is not detected as long as the overall system or subsystem achieves the overall salt rejection target. Pinhole leaks, O-ring leaks and other minor leaks may not be easily detected because the detection limit of conductivity. RO integrity issues may occur over the lifetime of a RO membrane (e.g., several months to 10 years) and never be identified as long as the overall system meets performance targets. Similar issues can occur with standard forward osmosis (FO) membranes.

Other existing membranes and membrane systems used to purify water, including: microfiltration (MF), ultrafiltration (UF), nanofiltration (NF), RO, and membrane distillation (MD) lack real-time, fail-safe methods for membrane integrity monitoring. This means that often there can be leaks in membrane filters that allow pathogens, virus, chemicals, and other unwanted contaminants to pass through these leaks for hours, days, or years before the integrity issue is detected.

In FO systems having pressurized feed streams, leaking from the feed stream into the draw stream may occur when membrane integrity is lost. Membrane integrity monitoring (e.g., for membrane leaks) and ultra-high purification are often inadequate in current membrane water purification systems. Membrane integrity monitoring generally refers to monitoring for and detecting leaks, defects in membranes, and/or other potential integrity issues that can cause pathogens and/or other undesired contaminants to go across the membrane when they would likely be rejected by the membrane if no integrity issue were present. There are problems with existing methods of FO treatment that inhibit membrane integrity monitoring and ultra-high purification. Existing methods for FO dewatering, filtration, and treatment use a pressurized feed approach such that the feed stream into and out of an FO unit is pressurized to a higher average hydrostatic pressure than the draw stream into and out of an FO unit which may allow unwanted contaminants to pass from the feed into the draw in the event of loss of membrane integrity. There are also limitations to membrane integrity monitoring in general within the water treatment industry.

Commercial MF and UF systems and similar membrane bioreactor (MBR) systems utilize air decay tests to monitor membrane integrity. This requires that the membranes be taken offline so that pressurized air can be pumped into the membrane housing and all inlets and outlets are closed to retain air pressure in the housing. The United States Environmental Protection Agency (USEPA) and other regulatory agencies have guidelines for a maximum amount of air pressure that can be released from the system in a certain amount of time for the membrane to be considered acceptable. If the membrane releases too much air pressure and fails the test, then it likely has a leak and is often replaced with a new membrane. However, because this is not a real time test, the membrane filter may have an integrity breach or leak for hours, days, or weeks before the integrity issue is identified.

SUMMARY

Methods of recovering water from a feed stream are disclosed. An example method includes introducing a feed stream having one or more solutes therein into a first side of a forward osmosis system. The example method includes circulating a draw stream through a second side of the forward osmosis system at a higher hydrostatic pressure and a higher osmotic pressure than the feed stream wherein a draw-to-feed osmotic pressure differential is at least 10 times higher than a draw-to-feed hydrostatic pressure differential. The example method includes generating a diluted draw stream in the second side of the forward osmosis system, the diluted draw stream having a higher water concentration than the draw stream. The example method includes recovering a permeate from the diluted draw stream.

Methods of recovering water from a feed stream via forward osmosis are disclosed. An example method includes introducing a feed stream having one or more solutes therein into a first side of a forward osmosis system. The example method includes circulating a draw stream comprising a marker through a second side of the forward osmosis system at a higher hydrostatic pressure and higher osmotic pressure than the feed stream. The example method includes generating a diluted draw stream in the second side of the forward osmosis system, the diluted draw stream having a higher water concentration than the draw stream. The example method includes recovering a permeate from the diluted draw stream. The example method includes concentrating the marker and the diluted draw stream to provide an at least partially regenerated draw stream. The example method includes circulating the at least partially regenerated draw stream back to the second side of the forward osmosis system.

Systems for dewatering a feed stream are disclosed. An example system includes a forward osmosis system configured to receive a feed stream and a draw stream, the draw stream including a marker, the forward osmosis system further configured to produce a diluted draw stream. The example system includes a concentration system configured to concentrate the diluted draw stream and the marker and at least partially regenerate the draw stream including the marker. The example system includes a pressure regulation system, the pressure regulation system configured to maintain the draw stream at a higher hydrostatic pressure than the feed stream in the forward osmosis system Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

For better understanding, the like elements have been designated by like reference numbers throughout the various accompanying figures. Understanding that these drawings depict only embodiments of the invention and are not therefore to be considered to be limiting of its scope, embodiments of the invention will be described and explained with additional specificity and detail through the use of the accompanying drawings in which.

Figure 1:
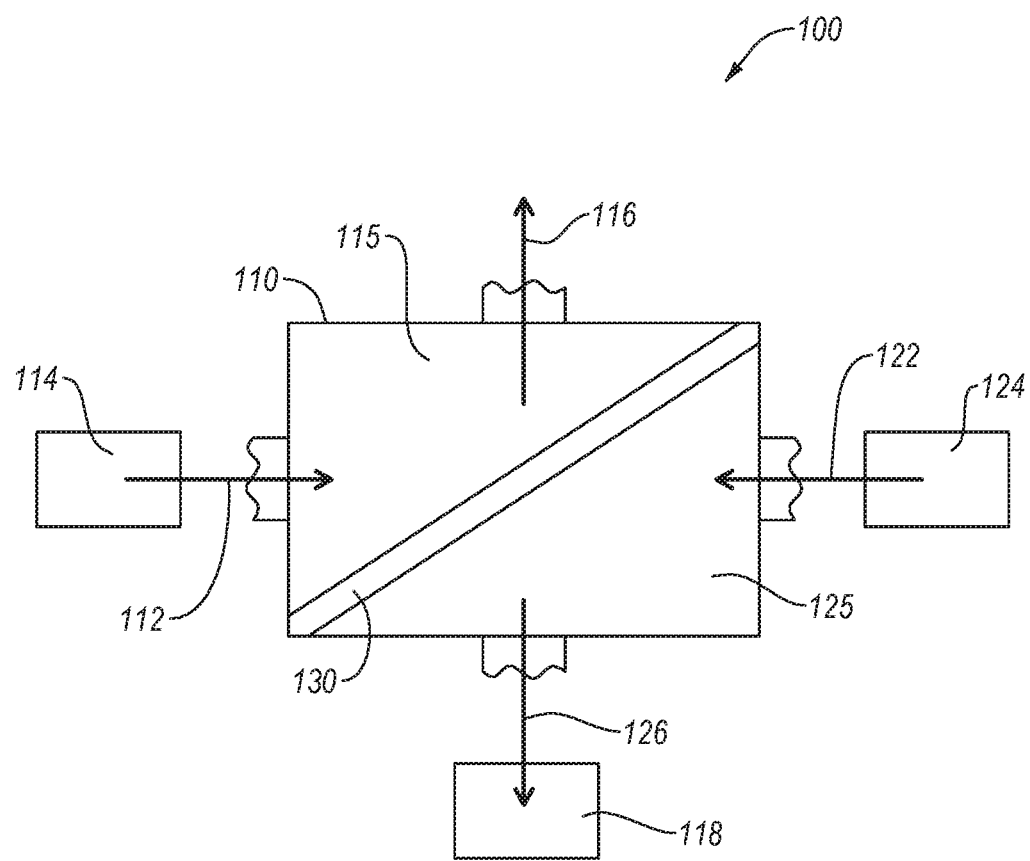
FIG. 1 is a block diagram of a counter-current forward osmosis system for removing one or more components from solutions, according to examples described herein.

all arranged in accordance with at least some embodiments of the present disclosure.

DETAILED DESCRIPTION

Examples of methods and systems disclosed herein utilize forward osmosis for separation of liquids. Forward osmosis (FO) generally refers to the process of transporting liquid components (e.g., solvents such as water) of a feed stream across a semipermeable membrane while rejecting one or more solutes in the feed stream. The FO process dewaters (e.g., concentrates) feed streams using a semipermeable membrane and a draw stream having a higher concentration of one or more components (e.g., solutes) than the feed stream to provide higher osmotic pressure in the draw stream. The driving force in FO, the transfer of at least one liquid and/or component (e.g., water) from the feed stream to the draw stream, is osmotic pressure generated from chemical potential of the two streams, unlike typical hydrostatic pressure-driven membrane processes such as RO. Hydrostatic pressure can also be applied to the draw stream to provide a higher hydrostatic pressure in the draw side of an FO element than in the feed side, which in the case of a breached membrane can cause the draw stream to penetrate into the feed side thereby preventing contamination of the draw stream with the feed stream. As the osmotic pressure in the draw stream is higher than in the feed stream, water passes from the feed stream to the draw stream via an FO membrane therebetween to form a diluted draw stream and a concentrated feed stream. In embodiments, the diluted draw stream is regenerated using the diluted draw stream, such as via one or more RO elements.

Example methods and systems disclosed can be specifically used for dewatering waste water solutions, water reuse, and concentrating solutions using FO. Dewatering generally refers to the removal of water from a material (e.g., a solid or another (aqueous) solution). Separation systems including FO elements may be used to treat solutions, which can include waste water, gray water, or even beverages. Generally any fluid stream may be included in a feed stream and may be treated and/or concentrated using example systems and methods described herein. Example fluid streams for use in feed streams include waste streams (which may be purified into clean water product streams in examples described herein) and product streams (which may be purified and/or concentrated in examples described herein). The contaminants included in the waste stream may generally be any pathogen, virus, emerging contaminants, or other substances not desired in drinking water or applications that utilize ultrapure water. Example waste streams include industrial and municipal wastewaters, produced waters, flowback waters, mine tailings, and various other waste streams. Product streams which may be treated and/or concentrated using examples described herein may generally include any food, beverage, mining, oil, gas, chemical, or other product that can be concentrated by osmosis. Example products are concentrated fruit juices, beer, wine, lithium, potash, algae, dairy, fertilizers, ammonia, sugars, biofuels and biofuel feed stocks, or other food, beverage or industrial products.

In this manner, examples of systems and methods described herein may provide a concentrated product or filtered water for reuse. The concentrated product may be, for example, concentrated lithium, potash, fruit juice, feedstock, chemical, or other concentrated product. The filtered water for reuse may be water from any waste stream. Advantageously, the concentrated product may be transported and shipped in a manner that may be more efficient than transporting and/or shipping the non-concentrated product. The concentrated product may then be reconstituted prior to consumption or used as a concentrate. The filtered water may be further treated for direct or indirect potable reuse, industrial reuse, used in a product or used for washdown, irrigation, or any general use of purified water.

Embodiments described herein relate to methods for removing water from solutions for product concentration and water reuse using forward osmosis (FO) with a pressurized draw stream, and systems for the same. Examples described herein include systems and methods for operating with a pressurized draw stream and systems configured in ways that facilitate methods for membrane integrity monitoring and/or providing enhanced purification.

In example embodiments, an FO element may be used to separate a solvent, such as water, in a feed stream from one or more contaminants or other solutes therein. The feed stream passes through a first side of the FO element, and a draw stream passes through a second side of the FO element. The first side and the second side of the FO element are separated and at least partially defined by at least one semipermeable FO membrane therebetween. The draw stream may have a relatively higher concentration of one or more solutes than the feed stream, such that osmotic pressure is induced (e.g., higher osmotic pressure in the draw stream than the feed stream) with respect to the one or more solutes, which causes at least one component (e.g., solvent) from the feed stream to pass into the draw stream through the at least one FO membrane. Accordingly, an osmotic pressure difference may be generated across the membrane, and solvent (e.g., water) may flow through the membrane from the feed stream into the draw stream. When the draw stream has a higher hydrostatic pressure than the feed stream and when leaks occur in the FO membrane, contamination of the draw stream with one or more solutes (e.g., contaminants) from the feed stream can be largely avoided due to the positive hydrostatic pressure at the membrane in the second side. For example, due to the positive hydrostatic pressure in the draw side, draw fluid may penetrate through a leak in an FO membrane into the feed side in a unidirectional flow, thereby preventing feed stream components from leaking into the draw stream. Put another way, the higher hydrostatic pressure of the draw stream opposes a flow of the feed stream through a breach (e.g., pinhole leak, membrane delamination, or membrane plate delamination) in the FO membrane, such that the feed stream is substantially prevented or retarded from passing through the breach. Further, when marker molecules are used in the draw stream, such leaks can be discovered by detecting the marker molecules in the feed stream and appropriate measures can be taken to repair or replace the leaking FO membrane. Accordingly, high resolution membrane integrity monitoring may allow the FO methods and systems disclosed herein to potentially be awarded 5-log removal or greater (e.g., about 99.999% or more) of contaminants (e.g., viruses and pathogens) from the feed stream instead of 2-log (e.g., about 99.0%) that would be expected via conductivity monitoring.

The osmotic pressure induced by higher concentrations of solute(s) on a second side of a separation membrane (e.g., FO or RO membrane) than a first side of the membrane can cause flow of a solvent (e.g., water) into the second side. The osmotic pressure can be used in concert with an elevated hydrostatic pressure on the second side of the membrane (as compared to the first side of the membrane). Such pressure differentials—both osmotic and hydrostatic—allow for migration of a solvent from the first side to the second side via the membrane due to osmotic pressure, and supply a positive hydrostatic pressure against the membrane such that in the case of a breach (e.g., pinholes or tears), the positive hydrostatic pressure causes the draw stream in the second side to pass into the first side while substantially preventing the feed stream in the first side from passing into the second side through the breach. The system outputs a concentrated feed stream and a diluted draw stream.

The separate feed and/or draw streams can be monitored by using one or more marker molecules in the feed and/or draw streams such that any markers that appear in the concentrated feed stream or diluted draw stream would be indicative of a breach in the membrane(s). Accordingly, real-time monitoring of the feed and/or draw streams with the systems herein could allow dependable water treatment to at least 2-log reduction in contaminants with FO, such as a 2-log reduction to a 6-log reduction, a 2-log reduction, at least a 3-log reduction, at least a 4-log reduction, at least a 5-log reduction, or even a 6-log reduction in contaminants. For DPR, it will be advantageous to provide real-time, high resolution integrity monitoring and a pressure barrier for rejection of harmful pathogens and emerging contaminants (e.g., chemicals) of concern.

In examples, one or more solvents can be selectively separated from one or more solutes (e.g., dissolved, dispersed, or suspended components of a solvent system) or other contaminants (e.g., viruses, pathogens, chemicals, etc.) therein using FO. The one or more solvents can include water. The solutes can include contaminants such as viruses; bacteria; microorganisms; inorganic chemicals (e.g., lead, mercury, arsenic, etc.); dissolved salt(s) (e.g., brine); organic chemicals such as urea, pesticides, pharmaceuticals, solvents, (e.g., benzene dioxane, triethylenechloride perchlorates, etc.), sugar (e.g., glycerol or polyethylene glycol (PEG)), etc.; dirt or soil; plant matter (e.g., fruit pulp); impurities; waste materials; chemicals (pharmaceuticals (e.g., at least partially dissolved), carcinogens, or other chemical toxins such as arsenic, perchlorates, or dioxins) or other components of liquid systems that are capable of filtration (e.g., retention or removal) at a semi-permeable membrane via FO, or combinations of any of the foregoing. Solutes can be at least partially dissolved, dispersed, or suspended in the feed stream.

In embodiments, the draw stream can include one or more draw solutes composed to increase the osmotic pressure in the draw stream. The term "draw solute" is used to differentiate between a solute in the feed side and a solute in the draw side of the systems and methods disclose herein. The draw solute(s) may be identical to or share one or more common components with the solute(s) in the feed stream. The draw solute(s) may include inorganic salt, for example sodium chloride, magnesium chloride, magnesium sulfate, or any other inorganic salt. The draw solute may include an organic compound, for example glycerol, sugar, PEG, or any other organic compound. The one or more draw solutes can be at least partially dissolved, dispersed, or suspended in the draw stream.

While certain solutions, distillates, permeates, concentrates, products, etc., are described as "streams" herein, it is understood that the "streams" may contain said solutions, distillates, permeates, concentrates, products, etc. The term "stream(s)" as used herein is intended to include the meaning of a flow or volume of a solution and is not intended to require that the stream has a constant flow.

Example systems for separating liquid components (e.g., dewatering) of a solution or mixture herein may include a primary fluid input providing a feed stream containing a feed solution (e.g., a solution); an FO membrane; and at least one fluid output including a concentrated feed stream containing the dewatered feed stream (e.g., feed concentrate). The systems herein may include a primary fluid input providing a draw stream on an opposite side of the FO membrane from the feed stream, and at least one output including a diluted draw stream containing water from the feed stream. The diluted draw stream can be further processed to provide a second system output, a permeate stream generally containing mostly water. Example systems herein may also include a draw stream input providing a draw stream containing the draw solution having a higher concentration of one or more components (e.g., solutes) than the feed stream and/or concentrated feed stream.

Typically, a pressurized draw approach may be disadvantageous to filtration because the pressurized draw stream can reduce membrane specific flux (liters/$m^2$/h/bar) and increase reverse salt flux. Specific flux is proportional to the driving force, either osmotic or hydrostatic pressure. Increasing the draw pressure will reduce the combined osmotic and hydrostatic pressure differential across the FO membrane, decreasing specific flux. Increasing the draw hydrostatic pressure will also increase the salt flux from the draw stream into the feed stream. However, careful control of the hydrostatic and osmotic pressures as disclosed herein can result in selective permeation of solvents from the feed stream, rejection of one or more solutes from the feed stream, and real-time monitoring of the membrane integrity. A pressurized draw approach may provide new methods for high resolution, real-time membrane integrity monitoring (e.g., instead of intermittent offline tests and low resolution methods like conductivity); provide a pressure barrier to keep pathogens out of the FO product water stream (e.g., water purification when pinhole or other leaks occur) during water treatment applications; provide a pressure barrier to keep wanted flavors and products in the FO concentrate (e.g., product retention when pinhole or other leaks occur) during product concentration applications; allow high resolution FO membrane integrity monitoring not possible with a pressurized feed approach; and provide new methods of utilizing draw solutes, markers, and sensors to provide membrane integrity monitoring of both FO and RO membranes in a combined FO and RO system.

Benefits and advantages of examples described herein are provided to facilitate appreciation of example systems described herein. It is to be understood that the benefits and advantages are exemplary only, and not all examples described herein may have all, or even any, of the benefits and advantages described.

FIG. 1 is a block diagram of a counter-current FO system 100 for removing one or more components from solutions. The FO system 100 is configured as a counter-current system. That is, the bulk flow of both a feed stream 112 and a draw stream 122 travels in opposite directions through an FO element(s) 110 in the system 100. The system 100 includes a feed stream source 114 which provides at least some of the feed stream 112 to at least one FO element 110. The system 100 further includes at least one draw stream source 124 fluidly coupled to the at least one FO element 110 and configured to provide the draw stream 122 to the at least one FO element 110. The feed stream 112 may be present in, and travel through, the FO element 110 in a first side 115 thereof. The draw stream 122 may be present in, and travel through, the FO element 110 in a second side 125 thereof. The first side 115 and the second side 125 are separated by at least one FO membrane 130 disposed therebetween. The at least one FO element 110 can include housing (e.g., a fluid tight container or assembly) at least partially defining an interior region in which the FO membrane 130 and first and second sides 115 and 125 are located. The second side 125 and the FO membrane 130 may be configured to maintain or withstand a higher hydrostatic pressure in the second side 125 than in the first side 115, such as without leaking or coming unglued.

While the first side 115 is described as the feed side and the second side 125 is described as the draw side, the designations first and second are merely for differentiation between the elements and not meant to be limiting of the elements or configuration of the system 100. For example, the first and second sides 115 and 125 can include separate volumes, layers, serpentine paths, etc., so long as the first side 115 is at least partially chemically separated from the second side 125, such as via at least one FO membrane 130 therebetween.

As the feed stream 112 and draw stream 122 travel through the FO element 110, one or more components (e.g., solvents such as water) of the feed stream 112 can permeate through the FO membrane 130 into the draw stream 122, aided at least in part by osmotic pressure differential between the first and second sides 115 and 125. The feed stream 112 can include a feed solution to be recovered or concentrated (e.g., dewatered), such as a solution, suspension, or dispersion containing any combination of solvent (e.g., water) and solutes (e.g., contaminants) disclosed herein. The draw stream 122 can include a draw solution having one or more components (e.g., solvent(s), and draw solute(s)) that induce a selected osmotic pressure difference between the first side 115 and the second side 125. For example, the draw stream 122 can include one or more of solvents (e.g., water); one or more dissolved salts (e.g., brine), sugar(s) (e.g., glycerol); or any component found in the feed stream 112. The presence or addition of one more draw solutes (e.g., glycerol) to the draw stream 122 may be effective to selectively control the osmotic pressure of the draw stream 122 effective to at least partially dewater (or remove any other solvent(s) from) the feed stream 112.

Specific concentrations of one or more components (e.g., solutes that increase osmotic pressure) present in the draw stream 122 can induce, increase, limit, or prevent one or more components from crossing the FO membrane 130 from the feed stream 112 into the draw stream 122. For example, a higher concentration of dissolved salt(s) present in the draw stream 122 than in the feed stream 112 can result in water being preferentially removed from the feed stream 112 via the FO membrane 130 into the draw stream 122 while the contaminants are retained in the feed stream 112. In the absence of osmotic pressure inducing components in the draw stream 122, net transfer of some components may not readily occur from the feed stream 112 to the draw stream 122.

In embodiments, a combination of at least two components (e.g., solvents and solutes) in the draw stream 122 can be used to provide a sufficient amount of osmotic pressure effective to induce, increase, limit, or prevent migration of one or more components (e.g., solvent or solutes such as water) from the feed stream 112 to the draw stream 122. For example, a combination of one or more solutes may induce a collectively higher osmotic pressure in the draw stream 122 than the osmotic pressure present in the feed stream 112, thereby inducing selective permeation of the solvent (e.g., water) across the FO membrane while the contaminants or other solutes in the feed stream are substantially entirely retained. For example, a higher concentration of the combination of dissolved salt(s) and sugar(s) present in the draw stream 122 over the concentration of solutes in the feed stream 112 can result in water being preferentially removed from the feed stream 112 via the FO membrane 130 while the solutes are retained in the feed stream 112. In embodiments, at least one solute may not be common to both the feed stream and the draw stream.

As the feed stream 112 is concentrated in the FO element 110 by removal of at least one fluid component (e.g., solvent such as water) thereof through the FO membrane 130, a feed concentrate 116 (e.g., concentrated waste water solution) is produced, such as in a stream. The feed concentrate 116 can be directed to one or more downstream (e.g., product) components fluidly coupled to the first side 115 of the FO element 110. As the draw stream 122 (e.g., draw solution) is diluted by addition of one or more components from the feed stream 112 (e.g., water) via the FO membrane 130, the system 100 produces a diluted draw stream 126 e.g., draw stream having a similar or higher concentration of one or more components thereof such as water, than were present when the draw stream entered the FO element 110). The diluted draw stream 126 can be directed to one or more downstream draw components 118 fluidly coupled to the second side 125 of the FO element 110.

The feed stream source 114 can include one or more of a tank, a pressurized pump, a valve, a pipe, a conduit, a hose, a temperature control element, a wastewater supply, etc. The feed stream source 114 can be operably coupled to a waste water supply. The feed stream source 114 is fluidly coupled (e.g., plumbed) to the first side 115 of the FO element 110. The feed stream source 114 can be configured to selectively provide a desired feed rate and/or pressure of the feed stream 112 to the FO element 110. The draw stream source 124 can include one or more of a tank, a pressurized pump, a valve, a pipe, a conduit, a hose, a temperature control element, etc. The draw stream source 124 can be fluidly coupled to a draw solution supply such as a draw stream regeneration system (discussed in detail below) or a draw solution tank or line. The draw stream source 124 is fluidly coupled to the second side 125 of the FO element 110. The draw stream source 124 can be configured to selectively provide a desired flow rate and/or hydrostatic pressure of the draw stream 122 to the FO element 110. For example, the draw stream source 124 can include a pressurized pump configured to provide the draw stream 122 at a higher hydrostatic pressure than the feed stream 112 to form a pressure differential therebetween (e.g., draw-to-feed hydrostatic pressure differential). The pressurized pump can provide the draw stream at a hydrostatic pressure that is at least 1 psi higher than the feed stream (e.g., draw-to-feed hydrostatic pressure differential having a positive value), such as at least about 2 psi higher, at least about 4 psi higher, at least about 5 psi higher, at least about 10 psi higher, about 1 psi to about 1000 psi higher, about 2 psi higher to about 1000 psi higher, about 4 psi to about 100 psi higher, about 15 psi to about 100 psi higher, about 1 psi to about 50 psi higher, about 2 psi to about 25 psi higher, about 10 psi to about 20 psi higher, about 5 psi to about 10 psi higher, about 3 psi to about 10 psi higher, or about 4 psi to about 8 psi higher than the hydrostatic pressure of the feed stream 112. The hydrostatic pressure on the second side 125 is maintained at a level effective to prevent or retard feed components from contaminating the draw stream in the case of a membrane breach yet low enough to allow osmotic pressure in the draw stream 122 to induce permeation of water through the FO membrane 130 from the feed stream 112. In examples, the hydrostatic pressure differential between the draw and feed stream may prevent or retard ions, organic components, and suspended solids from passing from the feed solution into the draw solution. This draw-to-feed hydrostatic pressure differential may also reduce the passage of dissolved contaminants through the FO membrane 130.

The hydrostatic pressures disclosed herein may be an average hydrostatic pressure in the draw side or the feed side, that is, the hydrostatic pressure of the stream averaged from the inlet to the outlet. Some hydrostatic pressure loss (e.g., head loss) is known to occur between the stream inlets and outlets in FO elements. Accordingly, the hydrostatic pressures herein may be considered as the average pressure over the course between the inlet and the outlet of a side in the FO element. Alternatively, in embodiments, the hydrostatic pressure (or differential thereof) disclosed herein can be the local pressure at the respective inlet, outlet, or other location in the system. Other methods of producing higher hydrostatic pressure in the draw side can be used, such as having a larger inlet than an outlet in the second side 125. However, in each case, the hydrostatic pressure in the second side 125 (e.g., draw stream/side) should be higher than the hydrostatic pressure in the first side (e.g., feed stream/side) at every point along a membrane area (e.g., entirety of a membrane or plurality of membranes) dividing the first and second sides 115 and 125. In embodiments, the positive draw-to-feed hydrostatic pressure differential can be monitored and verified by an independent pressure monitoring system.

The higher hydrostatic pressure in the second side 125 (draw stream side) of the FO element 110 provides a pressure barrier in the case of FO membrane breach or other portions of the FO element leaking (e.g., delamination or separation along glue lines between FO membrane elements). This pressure barrier prevents the feed stream from contaminating the draw stream by providing enough pressure such that only the draw stream passes through the breach or leak point.

A higher draw solute(s) concentration in the draw stream than the solute(s) concentration in the feed stream can induce osmotic pressure between the draw stream 122 and the feed stream 112 effective to drive migration of solvent (e.g., water from the feed stream 112 to the draw stream 122 via the FO membrane 130. Such a differential in solute concentrations (and relative osmotic pressures based thereon) may generate at least 1 psi of osmotic pressure differential between the draw stream 122 and the feed stream 112 (e.g., draw-to-feed osmotic pressure differential), such as about 1 psi to about 1000 psi, about 100 psi to about 1000 psi, about 20 psi to about 500 psi, about 100 psi to about 400 psi, about 200 psi to about 600 psi, about 50 psi to about 200 psi, about 1 psi to about 10 psi, about 5 psi to about 20 psi, about 10 psi to about 50 psi, or greater than 0 psi to about 5 psi, or greater than 0 psi to about 2 psi of draw-to-feed osmotic pressure differential. In embodiments, the draw-to-feed osmotic pressure differential may be considered an average differential along the entire membrane area between the first and second sides 115 and 125. For example, a higher osmotic pressure differential may be expected at an input of the draw side, where the draw solute concentration is highest, than at an output of the draw side where the cumulative migration of water across the membrane in the RO element dilutes the draw solute and lowers the osmotic pressure differential. Alternatively, in embodiments, the draw-to-feed osmotic pressure differential disclosed herein can be the local osmotic pressure differential at the respective inlet, outlet, or other location in the system.

The draw-to-feed osmotic pressure differential may be maintained at a higher value that the draw-to-feed hydrostatic pressure differential, such as at least 2 times higher than the draw-to-feed hydrostatic pressure differential, at least 3 times higher, at least 4 times higher, at least 5 times higher, at least 8 times higher, at least 10 times higher, at least 12 times higher, at least 15 times higher, at least 18 times higher, at least 20 time higher, at least 25 times higher, at least 50 times higher, at least 100 times higher than the draw-to-feed hydrostatic pressure differential, or ranges spanning any combination of the foregoing values. For example, the draw-to-feed osmotic pressure differential may be at least 20 psi, while the draw-to-feed hydrostatic pressure differential may be about 2 psi (e.g., draw-to-feed osmotic pressure differential is at least 10 times higher than a draw-to-feed hydrostatic pressure differential). In such an embodiment, the flow of solvent from the feed stream 112 to the draw stream 122 may progress at a selected rate even in the presence of the relatively higher hydrostatic pressure in the draw stream. Simultaneously, the feed solution is prevented or retarded from entering the draw stream via any breaches in the membrane system (e.g., pinhole leaks, delamination or separation of membrane from spacer plates, or delamination or separation of adjacent spacer plates). In embodiments, the FO membrane 130 or FO element 110 may include one or more breaches (e.g., leaks, pinholes, delaminations, etc.) between the first and second sides 115 and 125 but the positive hydrostatic pressure differential prevents or retards contaminants from the feed stream 112 from entering the draw stream 122 due to the draw stream 122 being forced into the feed stream 112 through the breach(es) by the pressure differential, all while the solvent is still passed from the feed stream 112 through the FO membrane 130 into the draw stream 122 via the osmotic pressure differential. Such pressure differentials reduce or eliminate the flow of contaminants from the feed stream 112 to the draw stream 122 even in the presence of breaches in the system integrity.

Returning to FIG. 1, the FO element 110 may be any FO element or array of elements, including but not limited to, a spiral wound FO element or standard (submersible) plate and frame FO element(s). The FO membrane(s) 130 of the FO element(s) 110 can include any permeable membrane such as a selectively permeably membrane configured to allow passage of one or more components of the feed stream (e.g., water) therethrough, while rejecting one or more components of the feed stream (e.g., retained contaminants or other solutes). In examples, the FO membrane 130 may be a polymeric membrane including a polymeric material therein such as a polyamide, a cellulose acetate, aramid, poly(vinylidene fluoride), polyacrylonitrile, polysulphone, or any other polymer material suitable for use as a FO membrane. In examples, the FO membrane may include thin film composite membrane including one or more of any of the polymer materials disclosed above. In examples, the FO membrane 130 may include one or more support layers supporting one or more functional layers, such as one or more polyamide thin film layers. In embodiments, the FO membrane 130 can include an array of FO membranes that may be in arranged parallel or in series (e.g., a baffled arrangement), or in any combination of parallel and series. The number of turns in a serpentine path (e.g., baffles) caused by an alternating series arrangement of FO membranes can cause some pressure loss between a stream inlet and outlet. Examples of FO elements, FO membranes, and components thereof suitable for use in the FO systems described herein can include any of those described in U.S. Pat. No. 8,920,654, filed Sept. 30, 2011; U.S. Patent Application Publication No. US 2014/0175011 filed Dec. 20, 2013 and corresponding issued U.S. Pat. No. 9,636,635; PCT Application PCT/US2014/029227 filed Mar. 14, 2014; and PCT Application PCT/US2014/029332 filed Mar. 14, 2014, each of which is incorporated by this reference in its entirety for any purpose.

In an embodiment, a feed stream 112 may be pressurized by a pump (e.g., feed stream source 114) to provide the feed stream 112 to first side 115 the FO element 110 at a relatively low pressure (e.g., 10 gallons per minute (gpm) at 100 psi osmotic pressure and 4 psi hydrostatic pressure). The feed stream 112 may be any waste stream solution. FO element 110 or array of elements may receive feed stream 112 and dispense feed concentrate 116 at a lower hydrostatic pressure and rate and higher osmotic pressure than when introduced into the FO element 110 (e.g., 500 psi osmotic pressure and 2 gpm at 2 psi hydrostatic pressure). The FO element 110 may be any FO element or array of elements, including but not limited to: spiral wound or plate and frame. The draw stream 122 may be pressurized by a pump (e.g., draw stream source 124) to provide the draw stream 122 to the second side 125 of the FO element 110 at a relatively higher pressure (e.g., 600 psi osmotic pressure and 24 gpm at 14 psi hydrostatic pressure) than the feed stream 112. The draw stream 122 may include water and at least one draw solute (e.g., NaCl and/or glycerol). The at least one draw solute may be present in a concentration effective to produce a greater osmotic pressure in the draw stream 122 than is present in the feed stream 112. The FO element 110 may receive the pressurized draw stream 122 and dispense a diluted draw stream 126 (e.g., 300 psi osmotic pressure and 48 gpm at 12 psi hydrostatic pressure). Water may permeate from the feed stream 112 to the draw stream 122 across the FO membrane 130 due at least in part to the higher osmotic pressure in the draw stream 122. The FO membrane 130 may be any membrane disclosed herein. In the event of a leak or other integrity breach of the membrane, the unwanted solids or organisms (e.g., fruit pulp or pathogens) may be prevented and/or inhibited from transferring from the feed stream 112 to the draw stream 122 which while at a relatively low hydrostatic pressure (e.g., about 200 psi or less) is nonetheless at a higher hydrostatic pressure than the feed stream 112. The relatively higher hydrostatic pressure in the draw stream 122 (e.g., 14 psi to 12 psi through FO system) may allow water to flow from draw stream 122 into feed stream 112 while substantially preventing the feed stream from traveling through the leak or integrity breach.

In the event of a leak in the FO element 110, the draw stream 122 flow rate through the leak may be higher with higher hydrostatic draw pressures. A higher hydrostatic pressure in the draw stream 122 retards the osmotic pressure therein, and may therefore require a higher draw solute concentration (or marker concentration in the case of embodiments with markers) to attain the same flux as lower hydrostatic pressure draw streams. In examples using marker(s) to detect leaks, although higher hydrostatic draw pressures retard osmosis, leak rates may be increased by the higher hydrostatic pressure in the draw stream, thereby providing more marker into the feed stream 112 from the draw stream, further improving leak detection. In examples, the draw stream hydrostatic pressure may be conserved and system energy consumption may increase minimally with hydrostatic draw pressure, such as described in PCT Application PCT/US2014/29227 filed Mar. 14, 2014, which is incorporated herein in its entirety by this reference.

As explained in more detail below, in embodiments, the draw stream 122 may be regenerated and reused from the diluted draw stream 126, such as via at least one RO element operably coupled to the diluted draw stream 126.

Alternatively to FIG. 1, in embodiments, the FO element(s) 110 may be operated in co-current configuration. However, counter-current processing may allow the use of a reduced amount of solute(s) in the draw stream compared to co-current flows because the solute(s) concentration and osmotic differential between the feed stream and draw stream may be essentially constant in the counter current-system.

Figure 2:
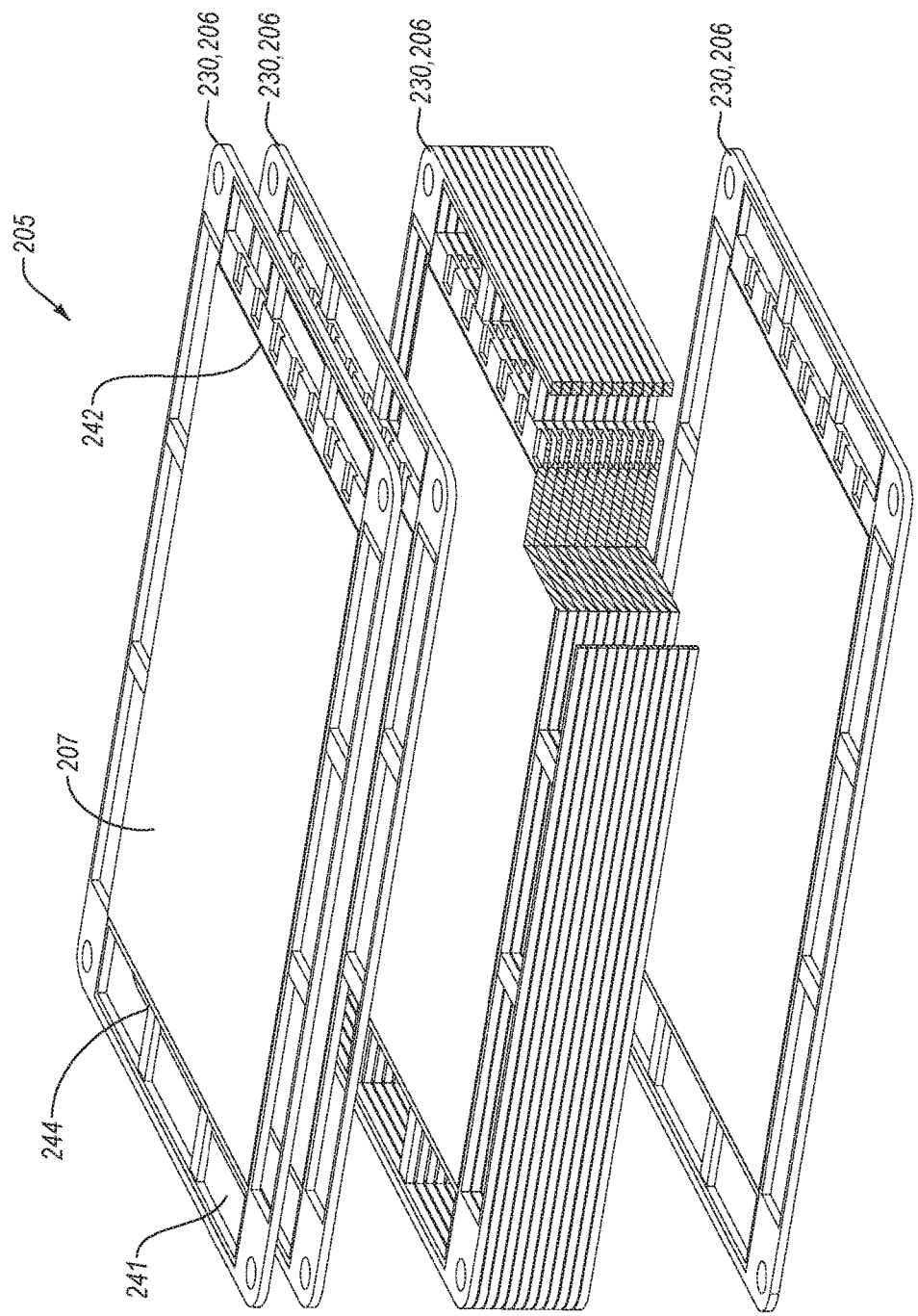
FIG. 2 is an isometric view of multiple membrane plate assemblies arranged in a stack, according to examples described herein.

FIG. 2 is an isometric view of a plurality of membrane plate assemblies 230, arranged in a stack 205. Each of the membrane plate assemblies 230 may include a spacer plate 206 having a plurality of inlets 242 and outlets 244 therein. Each of the membrane plate assemblies 230 may include at least one semi-permeable membrane 207 disposed thereon, such as in an interior spacing region thereof. In embodiments, each membrane plate assemblies may include at least one semi-permeable membrane 207 on each side of the interior spacing region. In embodiments, the inlets 242 may be configured to channel a fluid (e.g., a feed stream or a draw stream) into a space between the semi-permeable membranes 207 disposed on each side of the spacer plate 206. In such embodiments, a second fluid (e.g., draw stream or feed stream) may be passed over the outside of the semi-permeable membranes 207 on each side of the spacer plate 206.

Once stacked, the one or more openings 241 of the spacer plates 206 may be arranged such that the inlets 242 and outlets 244 may align with one another to form a unified manifold. The spacer plates 206 of the membrane plate assemblies 230 may be glued together to form the unified manifold. Any number of membrane plate assemblies 230 arranged in a stack 205 may be used in any of the FO elements disclosed herein. For example, an FO element can include at least one membrane plate assembly 230, such as 1 to 100 membrane plates assemblies, 5 to 80 membrane plates assemblies, 10 to 50 membrane plates assemblies, 15 to 40 membrane plates assemblies, 25 to 75 membrane plates assemblies, or less than about 100 membrane plate assemblies.

In some examples, the one or more openings 241 aligned with one another may allow a fluid to be in fluid communication with multiple conduits of the spacer plates 206 of each of the membrane plate assemblies 230 in the stack 205. In this manner, parallel flow may be achieved. In some examples, the openings 241 of one of the spacer plates 206 may be blocked (e.g., baffled) to force all of the fluid to pass through the conduits of that spacer plate 206. In this manner, series flow (e.g., baffling) may be achieved. In some examples, baffles may be inserted into openings of spacer plates 206 or some spacer plates 206 may be injection molded without one or more openings. The baffles may block feed or draw solution pathways that lead to a common outlet and thereby, redirect these flows across one or more additional membrane sheets before the feed or draw solutions are respectively recombined and exit an FO element. Series configurations (e.g., serpentine) or baffled elements may be suitable for a pressurized draw approach because they may allow the head loss (e.g., pressure drop) through an FO element and series of elements to be engineered and controlled (e.g., by selecting a number of parallel and/or series elements) such that the draw solution pressure is greater or uniformly greater than the feed solution pressure at any point within the FO element, array of FO elements, or FO system.

In embodiments, each of the membrane plate assemblies 230 in a FO element may be arrange in parallel. In embodiments, each of the membrane plate assemblies 230 in a FO element may be arranged in series (e.g., alternating 180 degree orientations or baffled to form a serpentine flow path). In embodiments, some of the membrane plate assemblies 230 in a FO element may be arrange in parallel and some may be arranged in series.

In embodiments, the membrane element may be arranged as a spiral wound FO element. In such embodiments, the structure of a traditional spiral would element would have to be altered to properly function as a spiral would FO element under a higher draw pressure. For example, by inverting the system components (and corresponding feed and draw flows), the pressure in the draw side does not damage the system or render it non-functional. In embodiments, the FO elements may be submersible elements.

Figure 3:
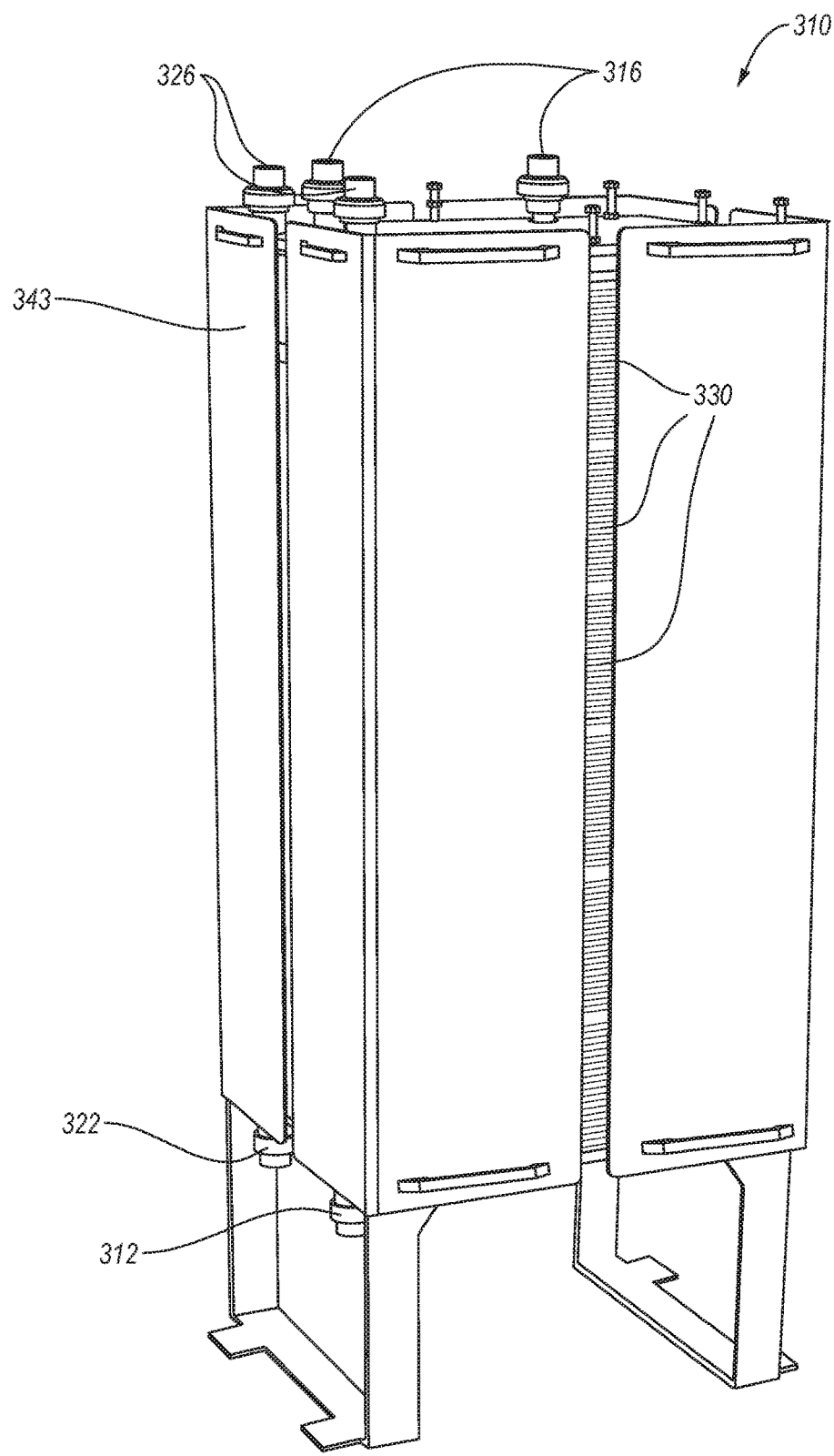
FIG. 3 is an isometric view of a forward osmosis module, according to examples described herein.

FIG. 3 is an isometric view of an FO element 310 or module with membrane plate assemblies 330, according to an embodiment. The FO module includes a housing 343 and a plurality of membrane plate assemblies 330 disposed at least partially within the housing 343. In some embodiments, the housing 343 may be substantially fluid tight. As shown, in some embodiments, the housing may be open on one or more portions thereof, such as when the feed stream and draw stream are sealed between the plurality of membrane plate assemblies 330 in different (e.g., separate) flow paths. Each membrane plate assembly 330 may be similar or identical to the membrane plate assemblies 230 disclosed herein. The FO module includes a feed inlet 316 configured to receive the feed stream and a feed stream outlet (not shown) configured to allow the feed concentrate to flow therethrough (e.g., through the first side of the system) in counter-current operation. The FO element 310 includes a draw inlet 322 and 312 configured to receive the draw stream and a draw stream outlet 326 configured to allow the diluted draw stream to flow therethrough (e.g., through the second side of the system). In some embodiments, the membrane plate assemblies 330 may include baffles therein such that the feed stream may have increasing path lengths (e.g., increasing the number of paths in series, or decreasing path lengths (e.g., increasing the number of paths in parallel, decreasing the number of paths in series) as the feed stream decreases in volume with concentration and the draw stream increases. In co-current operation, the feed inlet the feed outlet may be switched so the feed and draw streams flow in the same direction through the FO element 310.

Without baffles on the feed side (e.g., first side), it may be that the feed stream flow rate decreases as the feed solution concentrates. At the same time, the draw stream velocity may increase due to dilution. This may lead to hydrostatic pressure drop on the feed side and hydrostatic pressure drop on the draw side. Baffles, however, may allow the internal flow paths of the FO element 310 to be designed and constructed such that the feed and draw velocities may be kept constant, increased, or decreased as selected through an FO element or array of elements. Constant, or controlled, feed and draw velocities may allow a nearly constant hydrostatic pressure differential along the entire membrane flow path, as discussed below. The baffled configurations can sustain a pressurized draw approach in a controlled manner during startup and continuous operations such that the membrane does not delaminate and sufficient performance can be attained.

Operating the draw stream at a higher hydrostatic pressure than the feed stream may create a positive hydrostatic pressure against the draw side (e.g., second side) of an FO element. That is, operating the draw stream at a higher hydrostatic pressure than the feed stream pushes the draw stream against the FO membrane to provide a pressure barrier between the feed stream and draw stream effective to prevent or limit leaks into the draw stream from the feed stream. If the membrane has integrity (e.g., no leaks), the FO membrane may satisfactorily operate in this manner because the osmotic pressure driving force may be higher than this hydrostatic force such that water may still flow from the feed stream across the FO membrane and into the draw stream. However, if there are small leaks, (e.g., pinhole leaks or separation of glue between spacer plates) the positive hydrostatic pressure may push draw solution from the draw side to the feed side, and in a one way flow thereby preventing feed solution from contaminating the draw side. The positive hydrostatic pressure on the draw side my prevent solids, contaminants, and other undesired compounds in the feed stream from traveling through the leak into the draw solution as would occur with the pressurized feed approach. The positive hydrostatic pressure differential should exist along the entire membrane flow path to prevent undetected leaks from contaminating the draw stream. Typical FO systems may not have positive hydrostatic pressure in most, or in at least small portions of, the draw stream. FO systems may have positive hydrostatic pressures by designing and constructing the FO elements to have a mixture of flow paths in parallel and in series, as described above. The pressurized draw approach may keep unwanted pathogens and contaminants out of the draw stream and system permeate (e.g., filtered water) in a dependable way that other membrane filters have failed to accomplish.

In some examples, a pressurized draw stream approach in a wastewater recycling application may utilize a hydrostatic pressure differential that may reduce or prevent solutes such as pathogens, small molecules, large molecules, algae, pulp, and/or any particle or compound from crossing into the filtered draw stream when an integrity issue occurs in the FO membrane element, and may increase the rejection of pathogens beyond what FO membranes would normally provide without this approach. In other examples, a pressurized draw approach may increase salt, antiscalants, biocides, and/or other beneficial solutes added to the draw stream at the membrane surface, decreasing fouling and improving long-term system performance.

During system operation, a small amount of undesirable feed solutes (contaminants) can enter the draw and may accumulate overtime as the draw is regenerated for multiple cycles. In order to achieve desired quality of the permeate stream, the draw stream may periodically or continuously need to be treated to reduce the contaminant concentration in it. The treatment may include full or partial replacement of the draw by fresh draw solution. The treatment may also include draw cleanup by membrane filtration such as NF or UF, absorption of the contaminants or destruction or inoculation of the contaminants by exposure to oxidants, UV, high pressure, temperature or any similar methods.

Figure 4:
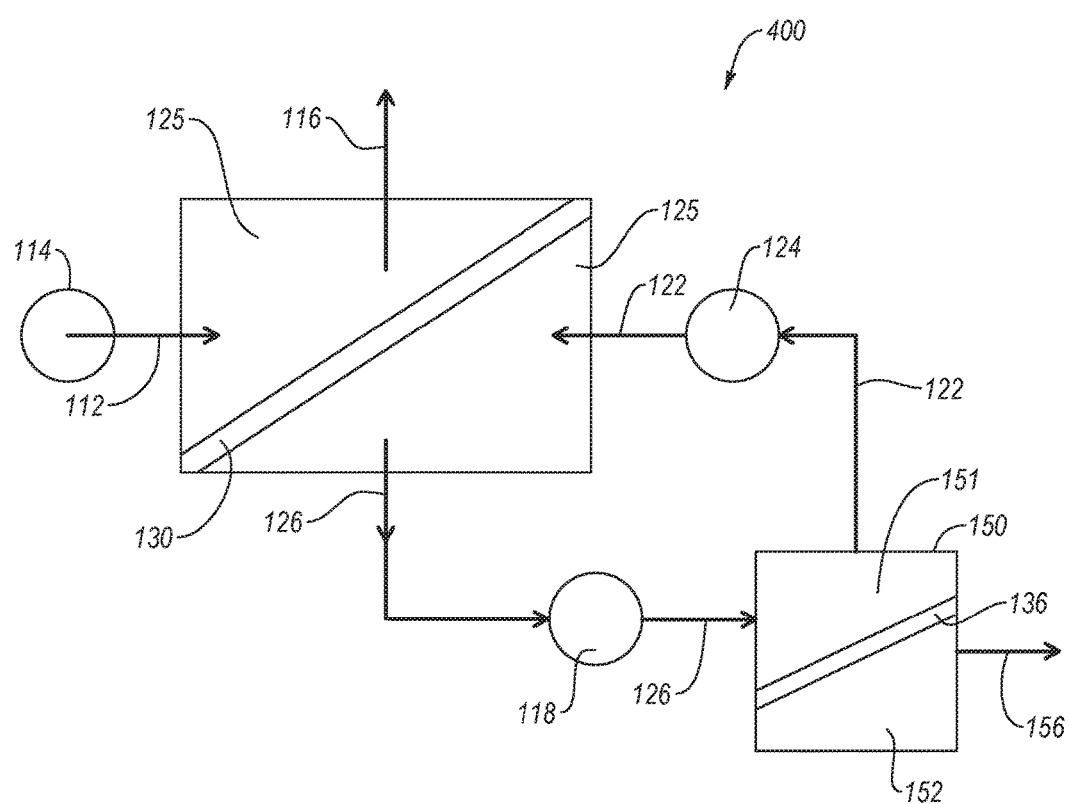
FIG. 4 is a block diagram of a counter-current system including a forward osmosis element and a reverse osmosis element for removing one or more components from solutions, according to examples described herein.

In some examples, the draw solution may be recovered from the diluted draw stream by RO. FIG. 4 is a block diagram of a counter-current system 400 including at least one FO element 110 and at least one RO element 150 (e.g., concentration system) for removing one or more components from a solution, according to examples. The system 400 includes the feed stream source 114 configured to supply feed stream 112 to the first side 115 of FO element 110, and a draw stream source 124 configured to supply draw stream 122 to the second side of FO element 110. The first side and second side 125 are separated and at least partially defined by the FO membrane 130 disposed therebetween. The FO membrane 130 can include any of the FO membranes, FO membrane plate assemblies, or stacks thereof disclosed herein, in any configuration disclosed herein. The FO element 110 outputs a feed concentrate 116 from the first side 115 and a diluted draw stream 126 from the second side 125. The feed concentrate 116 can include a concentrated waste water, a beverage concentrate, or any other concentrated feed solution disclosed herein. The feed concentrate can be directed to one or more of conduits, pumps, storage vessels, or end use sites. The FO element 110 can be operated as disclosed above.

The diluted draw stream 126 can be directed from the output of the second side 125 to one or more downstream components 118. The diluted draw stream 126 can be further processed to produce a permeate (e.g., potable water) and to regenerate the draw stream 122, such as via RO element 150 or other concentration system configured to concentrate the diluted draw stream and at least partially regenerate the draw stream. The one or more downstream components 118 and RO element(s) 150 can collectively form a draw stream regeneration system. The one or more downstream components 118 can include one or more conduits, pumps, storage tanks, osmosis elements, or end-use sites. For example, the diluted draw stream 126 can be directed from the output of the second side 125 to at least one pump configured to pressurize the diluted draw stream 126. The diluted draw stream 126 can be directed from the pump to the RO element 150 to separate at least some of the water therein from the diluted draw stream 126 and thereby produce (regenerated) draw stream 122.

In embodiments, at least one pump between the FO element 110 and the RO element 150 can be configured to pressurize the diluted draw stream 126 to a pressure selected to provide removal of water therefrom sufficient to produce a regenerated draw stream 122 having a similar or identical make-up to the draw stream 122 prior to entry into the FO element 110. In embodiments, at least one pump between the FO element 110 and the RO element 150 can be configured to pressurize the diluted draw stream 126 to a pressure selected to remove a maximum amount of water from the diluted draw stream 126 substantially without causing any solutes to pass through the RO membrane 136, such as to produce potable water (e.g., having at least a 2, 3, 4, or 5-log reduction in contaminants therein over the feed stream 112). The at least one pump can pressurize the diluted draw stream 126 to at least about 2 psi, such as about 10 psi, about 2 psi to about 1000 psi, about 4 psi to about 100 psi, about 5 psi to about 25 psi, about 50 psi to about 800 psi, about 100 psi to about 500 psi, about 200 psi to about 600 psi, about 400 psi to about 800 psi, about 500 psi to about 1000 psi, more than about 100 psi, more than about 500 psi, or more than about 750 psi. The diluted draw stream 126 can pass through the RO element 150 at any of the above pressures. The above pressures can be average pressures in the RO element 150.

The RO element 150 can include a housing containing an RO membrane 136 disposed therein. The housing (e.g., vessel or assembly) can be substantially fluid tight or open and configured to hold the RO membrane(s) 136 therein. The RO membranes 136 can be configured similarly or identically to the FO membranes disclosed herein, effective to at least partially define a first side 151 and second side 152 of the RO element 150. For example, the first side 151 and the second side 152 of the RO element 150 can be at least partially chemically separated by the RO membrane 136 disposed therebetween, thereby defining two distinct volumes within the RO element 150. The first side 151 and the second side 152 of the RO element 150 can be similar or analogous to the first side 115 and second side 125 of the FO elements 110 described herein. The RO membrane 136 can include any membrane suitable for RO (e.g., a standard RO membrane or a low rejection RO membrane). For example, the RO membrane 136 may separate at least some solvents (e.g., water) or solutes (e.g., dissolved salts and/or sugars, etc.), from a solution having water and solutes therein.

The diluted draw stream 126 can be directed to the first side 151 of the RO element 150 where the RO membrane 136 separates at least some of the water from the draw solutes (e.g., glucose, fructose, glycerol, dissolved salts, etc.) solvent (e.g., water) in the diluted draw stream 126 to at least partially regenerate the draw stream 122 as a RO concentrate of the at least one RO element 150. The draw stream 122 regenerated from the diluted draw stream 126 may contain mostly water and draw solutes such as in the same proportions as when the draw solution entered the first side 115 of the FO element 110. The RO element 150 may be operably coupled to the draw stream source such that, at least some of the draw stream 122 regenerated in the RO element 150 can be directed back to the draw stream source 124. In embodiments, the draw stream 122 output from the RO element 150 can be combined with one or more individual components of the draw solution to regenerate the draw stream 122 to a selected concentration of one or more solutes therein. For example, the RO concentrate 154 can be combined with at least a salt a sugar or other draw solute to regenerate draw stream 122. The RO element 150 can also produce an RO permeate 156 from the second side 152 thereof. The RO permeate 156 can include substantially pure water, suitable for use a potable water. The RO permeate 156 can be further processed to produce a pure permeate (e.g., purify water permeate of the RO system), such as via distillation, additional RO processes, advanced oxidation, etc. In embodiments, the RO permeate 156 can include or can be further processed to be substantially pure water (e.g., having at least a 2-log (e.g., 2, 3, 4, or 5-log) reduction in contaminants over the feed stream 112).

In embodiments, one or more pumps (not shown) can be used to control pressure of the RO permeate 156 or regenerated draw stream 122.

In embodiments, the RO element(s) 150 can be configured as low rejection RO element(s) and/or spiral wound reverse osmosis element(s). In examples, such as in low rejection RO elements, an element with increased or reduced solute rejection (over the FO membrane) may be used. The RO element(s) 150 may be configured as arrays of elements. The elements or arrays of elements may be operated in a continuous system or in a batch system with buffer tanks.

In an example, feed solution of 100 psi osmotic pressure may be pressurized by a pump (e.g., feed stream source 114) to form feed stream 112 having a hydrostatic pressure of 4 psi at 10 gpm. The FO element 110 may receive the feed stream 112 and dispense feed concentrate 116 at about 2 gpm and hydrostatic pressure of 2 psi and osmotic pressure of about 500 psi. Draw solution may be pressurized by a pump (e.g., draw stream source 124) forming draw stream 122 having an osmotic pressure of about 600 psi and a hydrostatic pressure of about 10 psi at about 24 gpm. The draw solution may include water and salt (e.g., NaCl). The FO element 110 may receive draw stream 122 and dispense diluted draw stream 126 at about 48 gpm and 8 psi. A pump (e.g., downstream component 118) may receive diluted draw stream 126 and produce diluted draw stream 126 having a high pressure of 800 psi at about 48 gpm. The RO element 150 may receive the (high-pressure) diluted draw stream 126 and produce draw stream 122 at 24 gpm and RO permeate 156 at 24 gpm. In some embodiments, the RO permeate 156 can have at least a 5-log reduction in one or more contaminants or other solutes over the feed stream 112.

In embodiments, the system 400 can include a plurality of RO elements in series and/or in parallel each configured to produce an RO permeate from the diluted draw stream. For example, the system 400 may include 2 or more RO elements 150, such as 2 to 50 RO elements, 2 to 20 RO elements, 10 to 30 RO elements, 20 to 40 RO elements, 25 to 50 RO elements, 2 to 5 RO elements, or 5 to 10 RO elements. At least some of the RO elements 150 can be coupled to each other in series to produce a progressively purer permeate (e.g., water), such as each RO membrane having a progressively smaller permeability and each RO permeate is directed to a subsequent RO element until an end product is formed. In embodiments, at least some of the RO elements 150 can be coupled to the diluted draw stream 126 in parallel to simultaneously produce the RO permeate 156 and regenerate the draw stream 122.

In embodiments, the RO permeate 156 can be directed to a distillation apparatus after leaving the RO element 150, for further purification. In embodiments, the RO permeate 156 can be directed tank or other vessel where advanced oxidation may be carried out. For example, the RO permeate 156 may be directed to a tank or fluid line wherein ozonation, photocatalytic oxidation (e.g., with a catalyst such as $TiO_2$), or UV cleavage of peroxide can be performed to produce hydroxyl radicals which readily act to purify water (e.g., react with contaminants to break down the same) via one or more radical reactions.

The use of FO with RO and distillation or advanced oxidation would allow a third barrier for the contaminants of concern for direct potable drinking water (e.g., DPR). For DPR, it will be advantageous to provide real-time, high resolution integrity monitoring and a pressure barrier for rejection of solutes (e.g., solutes of the feed stream 112) such as harmful pathogens and emerging contaminants of concern.

Figure 5:
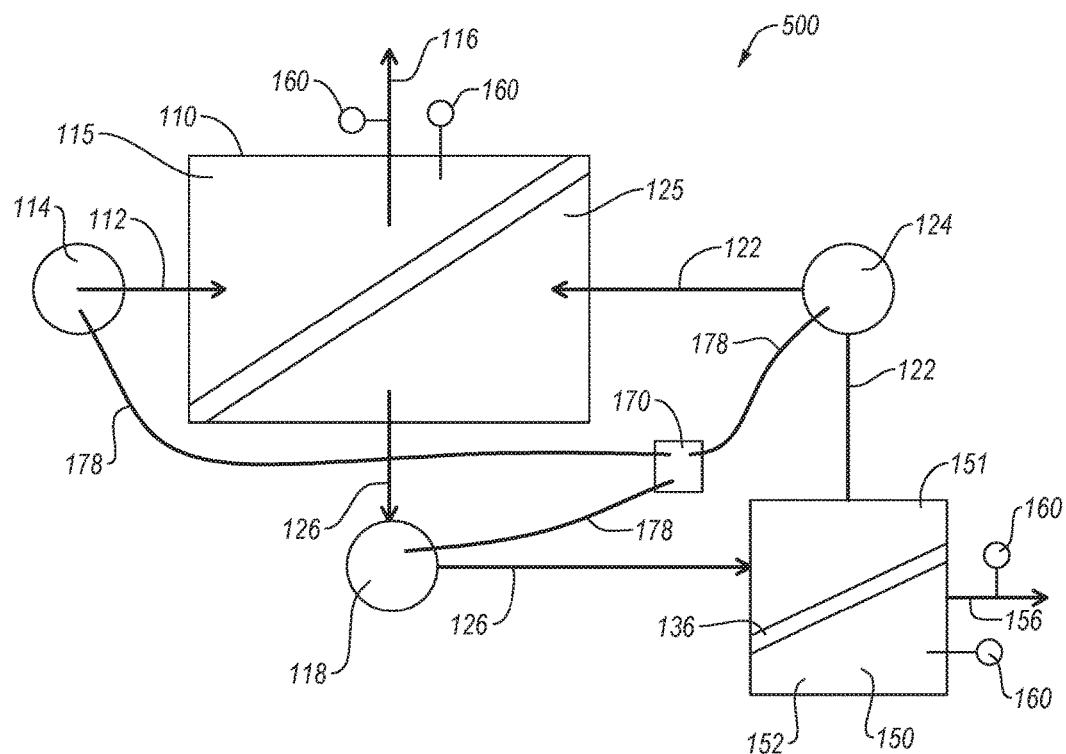
FIG. 5 is a block diagram of a countercurrent system including a forward osmosis element, a reverse osmosis element, and a sensor for removing one or more components from solutions and monitoring membrane integrity, according to examples described herein.

In embodiments, the draw stream 122 can have a marker (e.g., dye or chemical indicator) therein such that any leaks in the membrane can be discovered by detecting the marker in the feed stream 112 or feed concentrate 116. FIG. 5 is a block diagram of a system 500 including at least one FO element 110 and at least one RO element 150 (e.g., concentration system) for removing one or more components from a solution (and concentrating the diluted draw stream to at least partially regenerate the draw stream), according to examples. The system 500 can include at least one FO element 110 as disclosed herein and at least one RO element 150 as disclosed herein, including the respective disclosed components of each. The system 500 can include one or more sensors 160 or sensing devices configured to detect one or more markers in at least one of the feed stream 112, the feed concentrate 116, the draw stream 122, or the RO permeate 156. The one or more sensors 160 can be operably coupled to the first side 115 of the FO element 110, an output of the first side of the FO element (e.g., to monitor the feed concentrate 116), the second side 152 of the RO element 150, an output of the RO element 150 (e.g., in conduit or tank to monitor the RO permeate 156), or a draw stream input or diluted draw stream output of the second side of the FO element 110. For example, the at least one sensor 160 can be dispose in a conduit between an output of the first side 115 and a downstream feed product component (e.g., a feed concentrate storage tank, line, or dispenser). The one or more sensors 160 can be configured to the presence, absence, or concentration of one or more markers in the feed stream 112, the feed concentrate 116, the draw stream 122, the diluted draw stream 126, or the RO permeate 156 via one or more of UV-visible spectroscopy, fluorimetry, conductivity, or a fluoride selective electrode probe. Accordingly, the at least one sensor 160 can include a detector other portion of one or more of an ultraviolet spectrometer, a fluorimeter, a conductivity probe, or a selective ion probe. In embodiments, at least some of the one or more sensors 160 can be configured as pressure sensors (e.g., pressure transducers) to detect the pressure in one or more portions of the system. The pressure sensors can be disposed in one or more locations in both of the first side 115 (e.g., feed side) and the second side 125 (e.g., draw side) effective to monitor the difference in hydrostatic pressures between the first side 115 and the second side 125. The pressure sensors can be configured to continuously, intermittently, or instantly monitor the hydrostatic pressure of the first and second sides (and/or a hydrostatic pressure differential therebetween) and communicate the detected pressures to the controller 170 (e.g., collectively a pressure monitoring system).

In examples, the draw solution may include a dye or chemical (e.g., specifically identifiable or detectable chemical species such as a fluoride ion) intended to be a marker as a draw solute or in addition to the draw solute that may not be present or present at significant (e.g., detectable) concentrations in the feed solution. The marker may be composed to be easily recovered by the draw solution recovery system (e.g., RO element(s), distillation apparatus, etc.), and may be detected at a high resolution. Example markers may include organic dyes (e.g., fluorescein, pyrene, methylene blue, Rhodamine, or their derivatives), inorganic dyes (e.g., phthalocyanine, nanoparticles, or their derivatives), ions (e.g., sulfate, fluoride, chloride, sodium) or any substance that may be detected by a sensor in low concentrations (e.g., ppm or ppb scale), and in embodiments, in-line. The marker may be selective, such as to have low permeation from the draw side to the feed side for intact membranes. The marker membrane retention may be at least 99.0% (2-log), 99.9% (3-log), 99.99 (4-log), 99.999 (5-log), or greater. The marker membrane retention may be increased by increasing the marker concentration in the draw side, by increasing the size or molecular weight of the marker, by increasing the charge density, or any state-of-the-art method to improve membrane rejection. The marker may be one marker or a combination of markers. A combination of markers can be used with a desired ratio (e.g., 50% marker A and 50% marker B) for improved detection reliability in the feed, to avoid false positive or negative responses from sensors.

During use, the draw stream 122 having a higher hydrostatic pressure than the feed stream 112 and the marker(s) therein may be pushed into the feed stream 112 through any leaks in the FO element 110 (e.g., membrane breaches or adhesive failures). The feed stream is substantially free of the marker upon entering the FO element 110. The presence or concentration of the marker(s) in the draw stream 122 can be detected in the feed stream 112 using one or more sensors 160 in contact therewith, an indicate a loss of integrity of the FO element, such as a membrane breach or separation of spacer plates in a stack. For example, at least one sensor can be disposed within the first side 115 of the FO element 110, such as near an outlet thereof. In embodiments, at least one sensor 160 can be disposed in a conduit carrying the feed concentrate 116 out of the first side 115, to detect the marker(s) in the feed concentrate 116.

The at least one sensor 160 can be configured in-line with the system, that is, the at least one sensor 160 can be configured to take measurements, aliquots, or samples and determine the presence, absence, or concentration of the marker without interrupting the operation of the system 500. In embodiments, at least one sensor 160 can be disposed in one or more of the first side 115, the second side, 125, an outlet of the first side 115 (e.g., to test presence or concentration in feed concentrate 116), an outlet of the second side 125, a conduit between the feed stream source 114 (e.g., pump) and the FO element 110, a conduit between the draw stream source 124 (e.g., pump) and the FO element 110, a conduit between the draw outlet of the FO element 110 and the downstream component 118 (e.g., pump), a conduit between the downstream component 118 (e.g., pump) and the RO element 150, the first side 151 of the RO element 150, the second side 152 of the RO element 150, the output of the first side 151 of the RO element 150 (e.g., to detect presence or concentration in regenerated draw stream 122), the output of the second side 152 of the RO element 150 (e.g., to test presence or concentration in the (diluted draw) RO permeate 156).

In embodiments, the at least one sensor 160 can be configured to provide an indication (e.g., light, tone, or other indication) that the marker is present in the feed stream 112, feed concentrate 116, or RO permeate 156. In such embodiments, a user or operator can terminate or adjust operation of the system 500 in response to the indication.

In embodiments, the at least one sensor 160 can be operably coupled to a controller 170, such as via a wireless or hardwired connection 178 therebetween. The at least one sensor 160 and the controller 170 can be referred to collectively as the monitoring system. In embodiments with multiple sensors 160, a connection 178 between each sensor 160 and the controller 170 can be present. Each sensor 160 can be configured to sense and transmit sensor data to the controller 170 continuously, intermittently, or instantaneously (e.g., on demand). The monitoring system can be configured to monitor one or more of marker concentration, hydrostatic pressure, or flow rate in one or more portions of the system 500. For example, the sensor data can indicate the presence, absence, or concentration of the marker(s) in the feed stream 112, feed concentrate 116, draw stream 122, diluted draw stream 126, or RO permeate 156. The controller 170 can be configured to selectively control the operation of one or more portions of the system 500 responsive to the detected presence, absence, or concentration of the marker(s) in one or more of the feed stream 112, feed concentrate 116, draw stream 122, diluted draw stream 126, or RO permeate 156. For example, the controller 170 can be configured to terminate operation of the system responsive to receiving a sensing signal from the sensor 160 at the feed outlet of the first side 115 indicating that the feed concentrate 116 contains the marker(s) therein. In examples, the controller 170 can be configured to close one or more valves or deactivate or adjust (e.g., decrease or increase pressure produced by) one or more pumps responsive to receiving a sensing signal from the sensor 160 at the feed outlet of the first side 115 indicating that the feed concentrate 116 contains the marker(s) therein. The presence of the marker(s) in the feed concentrate 116 can indicate that the draw stream 122 is leaking into the feed stream 112 in the FO element, and that the FO element is in need of inspection, repair, or replacement. Such a system can ensure, in real-time, that the FO element 110 and overall system 500 is functioning properly and is not currently allowing contaminants into the draw stream 122 or downstream versions thereof (e.g., provides confirmation the system if functioning substantially without leaks and that at least a 2-log reduction in contaminants over the feed stream 112 is possible). The controller 170 can be configured to indicate to a user or operator, through a user interface (not shown) operably coupled thereto, that the markers have been detected and/or a concentration thereof in one or more portions of the system 500.

In embodiments, at least some of the at least one sensor 160 can include a pressure sensor (e.g., pressure transducer)

and/or flow rate sensor configured to determine an amount, increase, or decrease of pressure or flow rate in the first side 115, the second side, 125, an outlet of the first side 115, an outlet of the second side 125, a conduit between the feed stream source 114 (e.g., pump) and the FO element 110, a conduit between the draw stream source 124 (e.g., pump) and the FO element 110, a conduit between the draw outlet of the FO element 110 and the downstream component 118 (e.g., pump), a conduit between the downstream component 118 (e.g., pump) and the RO element 150, the first side 151 of the RO element 150, the second side 152 of the RO element 150, the output of the first side 151 of the RO element 150 (e.g., to test pressure of regenerated draw stream 122), the output of the second side 152 of the RO element 150 (e.g., to test pressure of RO permeate). The pressure sensors (of the monitoring system) can be configured to send sensor data indicative of the pressure in a portion of the system 500 to the controller 170. Responsive to the sensor data, the controller 170 can be configured to selectively alter (e.g., raise, lower, or maintain hydrostatic pressure in a portion of the system), initiate, or terminate operation of any component(s) of the system 500. For example, upon an indication that the hydrostatic pressure on the first or feed side of and FO element is above the hydrostatic pressure in second or draw side of the FO element (as indicated by pressure transducers therein), the controller may selectively alter, initiate, or terminate operation of one or more components of the system, such as by shutting the system down to prevent the higher pressure in the feed stream from causing contaminants to migrate into the draw stream. In embodiments, the system 500 can include one or more pressure sensors in both the first and second sides (e.g., feed and draw streams) to monitor (e.g., ensure/guarantee) that a positive pressure differential is maintained from the draw stream to the feed stream. The controller can include programming for and carry out selectively controlling the system based on insufficient pressure in the draw stream (e.g., a shutdown command), adequate pressure in the draw stream, or a selected differential in the pressures in the draw stream and feed stream. For example, if the sensors 160 do not detect that the pressure in the second, draw side of the FO element is at least 2 psi higher than the pressure of the first, feed side, the controller may increase the pressure applied by the draw source pump, reduce the pressure applied to the first side by the feed source pump, or may deactivate the system.

In embodiments, at least some of the one or more sensors 160 can be configured as pressure sensors (e.g., pressure transducers) to detect the pressure in one or more portions of the system. The pressure sensors can be disposed in one or more locations in both of the first side 115 (e.g., feed side) and the second side 125 (e.g., draw side) effective to monitor the difference in hydrostatic pressures between the first side 115 and the second side 125.

The pump(s) (e.g., feed stream source 114 and draw stream source 124) and controller can be collectively referred to as a pressure regulation system. The pressure regulation system can be used to regulate the pressure of the feed stream, the draw stream, the diluted draw stream, or any other solutions in the system 500. The pressure regulation system can be operably coupled to (e.g., share the controller 170) and communicate with the monitoring system. For example, the pressure regulation system is configured to selectively control (e.g., increase, decrease, initiate, or terminate) the hydrostatic pressure or flow rate of the feed stream, draw stream, or diluted draw stream in one or more portions of the system responsive to the monitoring system indicating (e.g., detecting) that the at least one marker is present in the feed concentrate or RO permeate. In some embodiments, the monitoring system can be configured to monitor both the hydrostatic pressure in the one or more portions of the system 500 and the presence and concentration of the marker in one or more portions of the system 500.

FIG. 5 illustrates a pressurized draw approach in the system 500 operating with chemical marker in the FO and RO elements to indicate whether a leak is present in the respective elements (e.g., the system 500 can function as described above in response to a detected leak in an RO element indicated by marker(s) in the RO permeate 156). In an example embodiment, the feed solution may be pressurized by pump (e.g., feed stream source 114) to provide feed stream 112 at 10 gpm at 4 psi. The feed solution may be any waste stream solution, such as waste water or municipal run-off. The feed stream 112 may be in contact with sensor 160 in the first side 115 of the FO element 110. Sensor 160 may configured as an ion selective fluoride probe. The FO element 110 (or array of FO elements) may receive feed stream 112 and dispense feed concentrate 116 at 2 gpm at 2 psi. Feed concentrate 45 may be in contact with a sensor 160 in a conduit operably coupled to an outlet of the first side 115. The draw solution may be pressurized by a pump (e.g., draw stream source 124) to provide draw stream 122 at 24 gpm and 8 psi, which while relatively low is nonetheless at a higher pressure than feed stream 112. The draw stream 122 may include water, a draw solute (e.g., NaCl), and a marker (e.g., fluoride). The FO element 110 receives the draw stream 122 and dispenses a diluted draw stream 126 at 32 gpm and 6 psi. The diluted draw stream 126 is directed to a pump (e.g., downstream component 118) and pressurizes the diluted draw stream 126 to provide the diluted draw stream 126 to the RO element 150 at an elevated pressure of about 800 psi at 32 gpm. The RO element 150 may receive the diluted draw stream 126 from the pump in a first side 151 thereof and produce draw stream 122 at about 24 gpm from the first side 151 and an RO permeate 156 from the second side 152 thereof at about 8 gpm. The RO permeate 156 may be in contact with a sensor 160 to detect the presence of the marker therein. Additional or fewer sensors may be used to customize operation for a given marker and feed stream. Water may permeate from the feed stream 112 to the draw stream 122 across an FO membrane and then permeate again from the diluted draw stream 126 to the RO permeate 156 across the RO membrane 136. When there is a leak or other integrity breach in the FO or RO membranes, then the draw solute measured by conductivity (e.g., NaCl) and the marker measured by high resolution instruments (e.g., UV-visible spectroscopy, fluorimeter, conductivity, or fluoride selective electrode probe) may flow from the higher pressure draw stream 122 into relatively lower pressure feed stream 112 because draw stream 122 (e.g., 8 psi to 6 psi through FO element 110) is at a higher hydrostatic pressure than feed stream 112 (e.g., 4 psi to 2 psi through FO element 110). The marker may alternatively or additionally, be pushed from diluted draw stream 126 into the RO permeate 156 such as by too much pressure in the first side 151 of the RO element 150 or a breach in the RO membrane 136. Accordingly, the system 500 can detect such leaks and shut down or inform an operator of the leak.

An FO system may be engineered to use any concentration of marker such that the resolution of membrane integrity monitoring is tuned to a specific project or application. Furthermore, if a moderate leak occurs that would significantly reduce the efficiency of osmosis, then the draw solute will begin to change the osmotic pressure in the feed stream.

When this occurs there may be a chain reaction such that osmosis may slow down, which may lead to detection of the leak via pressure sensors and flow meters via programmed low flow and/or low-pressure alarms in the controller 170. The controller 170 may be programmed to shut down the FO element 110 or system 500 responsive to the alarms and provide a fail-safe method for membrane integrity monitoring, preventing contamination of the filtered water for high purity reuse (e.g., IPR, DPR or other potable reuse), and providing advantageous methods for ensuring membrane integrity for water treatment applications. Moreover, such monitoring aids in recovery of the draw stream and markers therein, thereby preventing loss of the marker(s).

Figure 6:
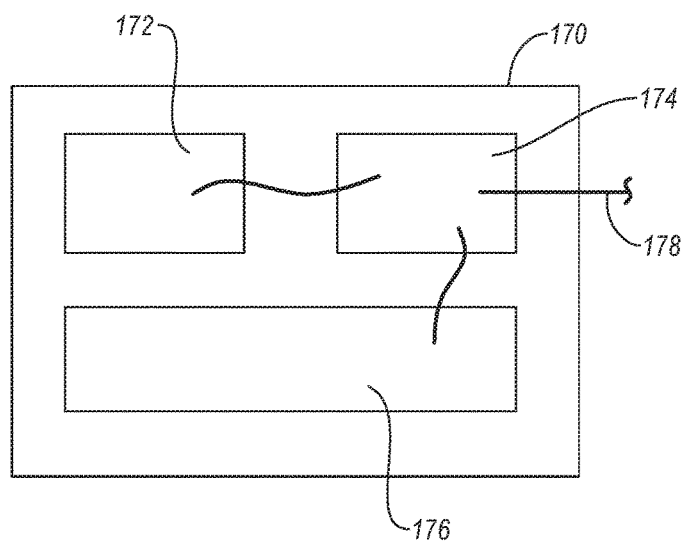
FIG. 6 is a block diagram of a controller of the system of FIG. 5, according to examples described herein.

FIG. 6 is a block diagram of the controller 170, according to embodiments. The controller 170 can include a memory storage medium 172 configured to store sensor data, one or more threshold values, or one or more operation programs having machine readable programs thereon. The memory storage medium 172 can include one or more of a solid state memory device, a hard disk drive, or any other memory storage device. The operational programs can include programs configured to direct one or more portions of the system 500 (e.g., pumps, valves, etc.) to terminate, initiate, or adjust operation.

The controller 170 can include a processor 174 operably coupled to, and configured to access, the memory storage medium 172. The processor 174 can be configured to access and execute one or more operational programs stored in the memory storage medium 172. The processor 174 can be configured to determine if a concentration of marker in a portion of the system 500 is above or below a threshold value, and responsive thereto, execute an operational program. For example, processor can be configured to determine if a sensing signal delivered via the connection 178 is indicative of a leak in a membrane by comparing the sensing signal information (e.g., concentration or presence of a marker) to a threshold value indicative of an acceptable amount of the marker in the portion of the system 500, and responsive thereto, control one or more components of the system 500. The processor 174 can be configured to determine if a hydrostatic pressure or flow rate a portion of the system 500 is above or below a threshold value, and responsive thereto, execute an operational program. For example, processor can be configured to determine if a sensing signal delivered via the connection 178 is indicative of a leak in a membrane flow rate or hydrostatic pressure in the second side 125) to a threshold value indicative of an acceptable flow rate or hydrostatic pressure in the portion of the system 500, and responsive thereto, control one or more components of the system 500 such as a pump to control the pressure (e.g., shut down flow completely or increase pressure). The threshold values of flow rates, pressures, concentrations, etc. can be accessed from the memory storage medium 172 by the processor 174 for comparison to one or more sensing signals form the at least one sensor 160. Responsive to determining that a flow rate, pressure, or concentration has exceeded a specific threshold value, the processor 174 can selectively execute an operational program to terminate or adjust operation of one or more components of the system 500.

In some embodiments, the controller 170 can include a user interface 176. The user interface 176 can include one or more of a screen, a keyboard, a keypad, a touchscreen, one or more light indicators, one or more audio indicators (e.g., speakers, alarms, etc.), or one or wireless communication devices (e.g., a network cellular connection to send text or e-mail messages to an operator). The user interface 176 can configured to provide visual or audio indication (e.g., alarms) of the status of one or more components of the system 500, one or more pressures or flow rates in the system, chemical composition of one or more fluids in the system, or a detected leak. The user interface 176 can be configured to accept input from a user, such as via a keyboard, touchpad, data port, or other input device thereon. The user interface 176 can be configured to accept input of operational programs or adjustments thereto from a user. The user interface can be configured to provide a means of manual control of the system 500, such as an on/off switch or electronic control of one or more components of the system 500 (e.g., control a pressure produced by a pump, open or close valves, or control a flow rate).

The controller 170 can be disposed on a component of the system 500, or can be remote from the other components of the system 500. For example, the controller 170 can be operably coupled to the components of the system 500 via one or more wireless connections 180 and the controller 170 located remote from the one or more components, such as a separate computer configured to control the system from an office.

In some embodiments (not shown), a single controller 170 can be operably coupled to multiple FO elements 110 (e.g., parallel FO elements) and one or more sensors 160 on each of the FO elements. The controller 170 can initiate, terminate, or adjust (e.g., increase or decrease pressure(s) or flow rate(s) in each FO element 110 independently, responsive to one or more sensing signals from a respective FO element 110. For example a single FO element of a plurality of parallel FO elements 110 can be shut down due to a detected marker in a feed concentrate, such that the FO element can be repaired, all while the other FO elements continue operation.

Each of the different fluid conveying or containing components of the systems disclosed herein can be operably (e.g., fluidly) coupled together via one or more conduits (e.g., pipes, tubes, hoses, etc.), valves, pumps, etc. For brevity, the components of the block diagrams are shown with arrows therebetween. It should be understood that each of the arrows may represent one or more conduits, valves, tanks, pumps, or other fluid connections between components of the systems.

Block diagrams of systems above may also be considered as a block diagram of exemplary methods. Such methods can be accomplished in a continuous series of operations as described above or in a batch wise manner (e.g., each FO or RO element operation is carried out separately).

Figure 7:
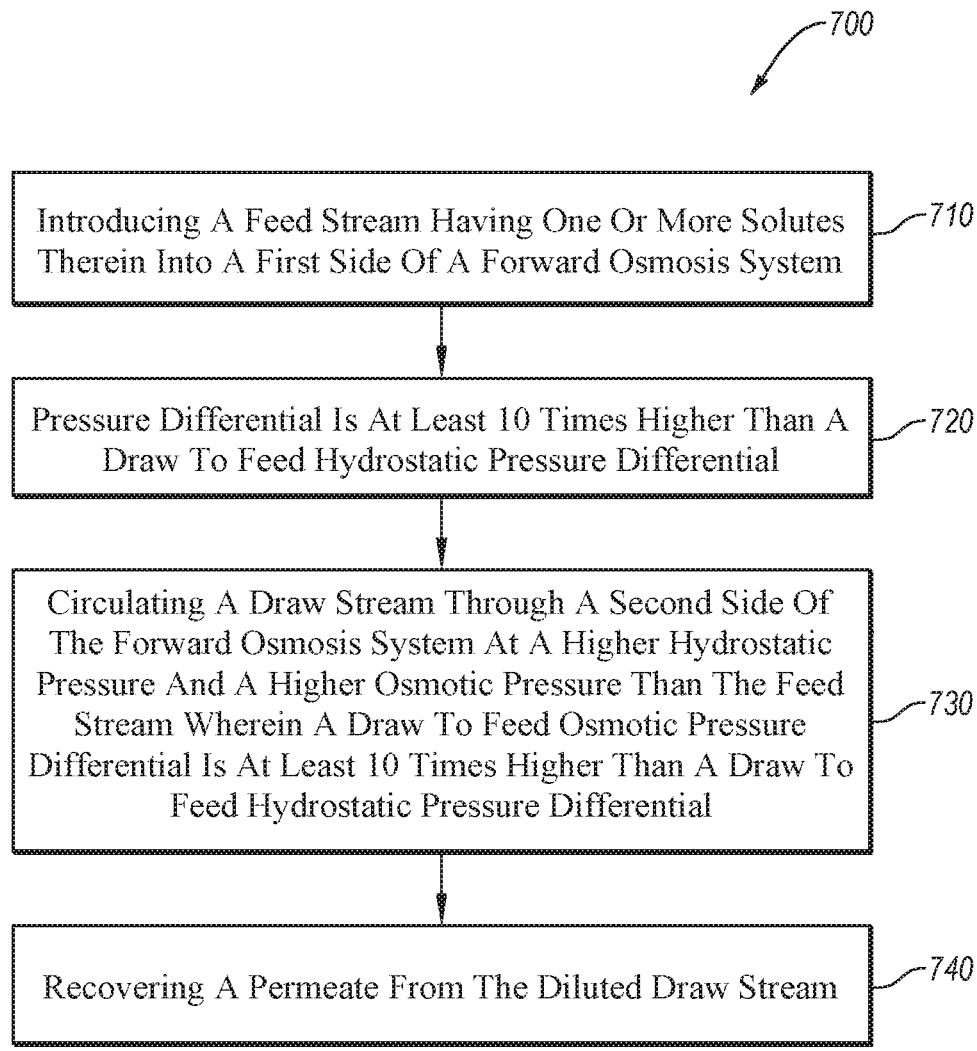
FIG. 7 is a flow diagram of a method for dewatering a solution, according to examples described herein.

FIG. 7 is a flow diagram of a method 700 for recovering water from a feed stream. In embodiments, the water recovered may be potable. The method 700 includes the acts of 710 introducing a feed stream having one or more solutes therein into a first side of a forward osmosis system; 720 circulating a draw stream through a second side of the forward osmosis system at a higher hydrostatic pressure and higher osmotic pressure than the feed stream, wherein a draw-to-feed osmotic pressure differential is at least 10 times higher than a draw-to-feed hydrostatic pressure differential; 730 generating a diluted draw stream in the second side of the forward osmosis system, the diluted draw stream having a higher water concentration than the draw stream; and 740 recovering a permeate from the diluted draw stream. The method 700 can be carried out using any of the systems or components thereof disclosed herein, such as FO element 110. The method 700 can be used to recover water (e.g., potable water) and/or to concentrate a solution (e.g., on the feed side) by removing at least one solute or solvent, such as water, therefrom.

In embodiments, 710 introducing a feed stream having one or more solutes therein into a first side of an FO system can include introducing any of the feed solutions disclosed herein into a first side of any of the FO systems disclosed herein. For example, introducing a feed stream having one or more solutes (e.g., retained solutes that remain on the feed side throughout the separation process) therein into a first side of an FO system can include introducing at least one of industrial or municipal wastewaters, produced waters, flowback waters, mine tailings, gray water, sewage, salt water, storm drain runoff, a beverage, or potable water. In embodiments, the one or more solutes can include one or more contaminants including at least one of a virus, a bacteria, a micro-organism, organic matter (e.g., sugar(s), urea, etc.), plant matter (e.g., algae or pulp), inorganic matter (e.g., salt(s) or dirt), chemicals (e.g., carcinogens, pharmaceuticals (e.g., at least partially dissolved), or arsenic) or a metal (e.g., transition metals).

In embodiments, 710 introducing a feed stream having one or more solutes therein into a first side of an FO system can include introducing the feed stream into the first side at a selected hydrostatic pressure and/or rate. The hydrostatic pressure of the feed stream can be about 1 psi or more such as about 1 psi to about 10,000,000 gallons per day (gpd), about 1 psi to about 5 psi, or less than about 10 psi. The flow rate can be about 1 gpm or more, such as about 1 gpm to about 50 gpm, about 2 gpm to about 40 gpm, about 5 gpm to about 30 gpm, about 10 gpm to about 25 gpm. In embodiments, 710 introducing a feed stream having one or more solutes therein into a first side of an FO system can include pressurizing a feed solution using a pump to form the feed stream. In embodiments, 710 introducing a feed stream having one or more solutes therein into a first side of an FO system can include circulating the feed stream through the first side of the FO element from an inlet to an outlet therein.

In embodiments, 720 circulating a draw stream through a second side of the FO system at a higher hydrostatic pressure and higher osmotic pressure than the feed stream, wherein a draw-to-feed osmotic pressure differential is at least 10 times higher than a draw-to-feed hydrostatic pressure differential can include feeding the draw stream into the second side of the FO element from an inlet to an outlet thereof. In embodiments, 720 circulating a draw stream through a second side of the FO system at a higher hydrostatic pressure and higher osmotic pressure than the feed stream, wherein a draw-to-feed osmotic pressure differential is at least 10 times higher than a draw-to-feed hydrostatic pressure differential can include using a draw stream having one or more draw components (e.g., solvent and draw solute(s)) therein configured to produce a higher osmotic pressure in the draw stream than in the feed stream. The one or more draw solutes can include inorganic solutes (e.g., salt(s)) or organic solutes. The draw solutes can include one or more of inorganic salt, for example sodium chloride, magnesium chloride, magnesium sulfate, or any other inorganic salt. The draw solutes can include an organic compound, for example glycerol, sugar, PEG, or any other organic compound. Circulating a draw stream through a second side of the forward osmosis system at a higher hydrostatic pressure and osmotic pressure than the feed stream, wherein a draw-to-feed osmotic pressure differential is at least 10 times higher than a draw-to-feed hydrostatic pressure differential can include providing one or more solutes in the draw stream in a concentration effective to induce higher osmotic pressure in the draw stream than the feed stream effective to induce water from the feed stream to permeate through a forward osmosis membrane disposed between the first side and the second side. Providing one or more solutes in the draw stream in a concentration effective to induce higher osmotic pressure in the draw stream than the feed stream can enable the draw-to-feed osmotic pressure differential to be at least 2 times higher than a draw-to-feed hydrostatic pressure differential, such as at least 3 times higher, at least 4 times higher, at least 5 times higher, at least 8 times higher, at least 10 times higher, at least 12 times higher, at least 15 times higher, at least 18 times higher, at least 20 time higher, at least 25 times higher, at least 50 times higher, at least 100 times higher than the draw-to-feed hydrostatic pressure differential, or ranges spanning any combination of the foregoing values.

In embodiments, 720 circulating a draw stream through a second side of the FO system at a higher hydrostatic pressure and higher osmotic pressure than the feed stream, wherein a draw-to-feed osmotic pressure differential is at least 10 times higher than a draw-to-feed hydrostatic pressure differential can include circulating the draw stream into and through the second side of the FO element at any of the hydrostatic pressures disclosed herein (and/or draw-to-feed hydrostatic pressure differentials), such as at least 1 psi greater than the hydrostatic pressure of the feed stream, about 1 psi greater to about 100 psi greater, about 2 psi greater to about 50 psi greater, about 4 psi to about 50 psi greater, about 5 psi greater to about 50 psi greater, about 2 psi greater to about 10 psi greater, about 5 psi greater to about 15 psi greater, about 5 psi greater to about 10 psi greater, about 2 psi greater to about 25 psi greater, about 5 psi to about 20 psi greater, or about 10 psi greater to about 20 greater than the hydrostatic pressure of the feed stream. In some embodiments, the draw hydrostatic pressure can be in a range from greater than the feed hydrostatic pressure to less than 100 psi greater than the feed hydrostatic pressure. In some embodiments, the average osmotic pressure of the draw stream may be at least about 10 psi greater than the average osmotic pressure of the feed stream, such as about 100 psi to about 1000 psi greater, about 20 psi greater to about 500 psi greater, or about 100 psi greater to about 400 psi greater than the average feed stream osmotic pressure. Circulating a draw stream through a second side of the FO system at a higher hydrostatic pressure and higher osmotic pressure than the feed stream, wherein a draw-to-feed osmotic pressure differential is at least 10 times higher than a draw-to-feed hydrostatic pressure differential can include pressurizing a draw solution in a pump to deliver the draw stream to the second side at any of the specific hydrostatic pressures disclosed herein.

In embodiments, circulating a draw stream through the second side of the forward osmosis system at a higher hydrostatic pressure and higher osmotic pressure than the feed stream, wherein a draw-to-feed osmotic pressure differential is at least 10 times higher than a draw-to-feed hydrostatic pressure differential includes providing one or more solutes in the draw stream in a concentration effective to induce higher osmotic pressure in the draw stream effective to induce water from the feed stream to permeate through a forward osmosis membrane disposed between the first side and the second side. In embodiments, circulating a draw stream through the second side of the forward osmosis system at a higher hydrostatic pressure and osmotic pressure than the feed stream, wherein a draw-to-feed osmotic pressure differential is at least 10 times higher than a draw-tofeed hydrostatic pressure differential includes circulating or providing at least one marker in the draw stream, such as at any of the markers or concentrations thereof disclosed herein (e.g., at least 1000 times higher than the minimum detectable concentration of the at least one marker).

In embodiments, 730 generating a diluted draw stream in the second side of the FO system, the diluted draw stream having a higher water concentration than the draw stream includes circulating the draw stream and the feed stream over an FO membrane. The FO membrane can include at least one of any of the FO membranes disclosed herein and in any configuration disclosed herein, such as in a parallel or serpentine configuration. Generating a diluted draw stream in the second side of the FO system can include removing at least some water from the feed stream while retaining substantially all of the one or more solutes therein, via the at least one FO membrane. Generating the diluted draw stream can include removing at least some water from the feed stream while producing a feed concentrate with a higher one or more solutes concentration than the feed stream, via a forward osmosis membrane.

In embodiments, 740 recovering a permeate from the diluted draw stream can include separating or recovering water from the diluted to draw stream. In embodiments, 740 recovering a permeate from the diluted draw stream can include processing the diluted draw stream in one or more downstream components such as at least one RO element, at least one distillation apparatus, or advanced oxidation apparatus to produce a permeate, such as water, from the diluted draw stream. In embodiments, 740 recovering a permeate from the diluted draw stream can include producing a permeate exhibiting at least a 2-log reduction in the concentration of at least one species (e.g., all species, only viruses, only pathogens, only bacteria, only small molecules (e.g., less than about 900 Daltons), only large molecules, or combinations thereof) the one or more solutes over the feed stream, such as a 2-log reduction to a 6-log reduction, a 2-log reduction, at least a 3-log reduction, at least a 4-log reduction, a 5-log reduction, or even a 6-log reduction. Recovering a permeate from the diluted draw stream (e.g., producing a permeate stream such as from at least one RO element) can include directing the diluted draw stream through at least one RO element. Directing the diluted draw stream through at least one RO element can include pressurizing the diluted draw stream to a pressure of at least about 2 psi, such as about 2 psi to about 1000 psi, about 4 psi to about 100 psi, about 5 psi to about 50 psi, about 50 psi to about 800 psi, about 100 psi to about 500 psi, about 200 psi to about 600 psi, about 400 psi to about 800 psi, about 500 psi to about 1000 psi, more than about 100 psi, more than about 500 psi, more than about 750 psi, or less than 100 psi while remaining greater than the hydrostatic pressure of the feed stream. Pressurizing the diluted draw stream can be carried out using one or more pumps disposed between the outlet of the second side of the FO element and an inlet of the first side of the at least one RO element. Recovering a permeate from the diluted draw stream can include producing a permeate stream from the diluted draw stream, where the permeate stream includes water exhibiting at least a 2-log reduction in a concentration of the one or more solutes over the feed stream, such as any of the reductions disclosed herein (e.g., 3-log, 5-log, etc.). The RO permeate may be substantially clean water (e.g., at least a 2-log reduction in contaminants) such as potable water (e.g., at least a 5-log reduction in contaminants). In embodiments, the RO permeate can be distilled or subject to advanced oxidation to provide an additional barrier to the solutes.

In embodiments, the method 700 can include sensing the presence or concentration of at least one the marker in the feed stream, feed concentrate, or an RO permeate (e.g., permeate stream). In such embodiments, circulating a draw stream through a second side of the FO system at a higher hydrostatic pressure and higher osmotic pressure than the feed stream can include circulating at least one marker in the draw stream, such as in any of the concentrations disclosed herein. Sensing the presence or concentration of the at least one marker in the feed stream feed concentrate, or RO permeate can include using one or more sensors to detect the at least one marker. One or more sensors can be disposed in the first side, an outlet of the first side, a downstream component operably coupled to the first side (e.g., a conduit or a pump), or any other component of the systems disclosed herein (e.g., an outlet on the second side of an RO element). The one or more sensors can include any of the sensors disclosed herein. Sensing the presence of the at least one marker can include sensing the presence or concentration of the at least one marker via one or more of ultraviolet spectroscopy, fluorimetry, conductivity, or a selective ion probe. The method 700 can include initiating, terminating or adjusting delivery (e.g., a flow rate or pressure) of one or more of the feed stream or the draw stream responsive to detecting a presence or concentration of the at least one marker in the draw stream (or a permeate stream). For example, flow of one or more of the feed stream or the draw stream or the entire system may be terminated upon detection of the marker in the feed stream, feed concentrate, or RO permeate. The method 700 can include selectively controlling (e.g., initiating, terminating or adjusting delivery of one or more of the feed stream or the draw stream) one or more portions of a system for separating solvent from a feed stream, responsive to detecting a presence or concentration of the at least one marker in the draw stream or permeate stream, such as via a controller operably coupled to the one or more sensors.

In some embodiments, a relatively large amount of marker may be added to or present in the draw stream. For example, the draw stream may be carrying a concentration of marker therein that is at least 1,000 times more concentrated than a minimum detectable concentration (detectable by any of the techniques disclosed herein), such that leaks from the draw to the feed are relatively easily detectable even at low infiltration of the draw stream into the feed stream. The concentration of the marker can be at least 100 times higher than the minimum detectable concentration of the marker, such as 100 times to 1,000,000 times higher, 1,000 times to 100,000 times higher, or at least 10,000 times higher concentration that the minimum detectable concentration of the marker. Using such large amounts of marker can be very expensive in RO systems where the marker is flushed out of the system with the RO reject stream. In the FO systems disclosed herein the marker can be recovered and reused in the draw stream. For example, as the draw stream is diluted, the marker remains in the diluted draw stream. As the diluted draw stream is further processed, the marker may be retained in the draw stream, such as upon further processing in and RO element where the marker remains in the RO concentrate/reject and is recycled (and can be reconcentrated) for reuse in the (regenerated) draw stream. In such a manner the systems and methods herein can include recycling or reusing the marker in the draw stream. Accordingly, a relatively high amount/concentration of the marker(s) can be used in the systems and methods therein while the expense of typically costly markers can be largely eliminated thereafter due to retention of the markers in the draw stream.

The method 700 can include regenerating the draw stream. Regenerating the draw stream can include directing the diluted draw stream through at least one RO element and collecting the draw stream from the first side of the RO element (e.g., RO concentrate or reject stream). The draw stream can be at least partially regenerated by the RO process. In embodiments, additional solutes or water can be added to the draw stream collected from the RO element to control the osmotic pressure in the (now at least partially regenerated) draw stream. The draw stream collected from the first side of the RO element can be directed to a pump for pressurization for use in the at least one FO element.

In embodiments, regenerating the draw stream from the diluted draw stream may include separating at least some of the one or more solvents (e.g., water) and/or solutes (e.g., ethanol) in the diluted draw stream from at least some of the other solutes (e.g., glycerol) in the diluted draw stream. In embodiments, regenerating the draw stream from the diluted draw stream may further include concentrating the at least some of the one or more solutes (e.g., ethanol) or at least some of the other solutes (e.g., glycerol), such as by RO operations and/or distillation(s). In embodiments, one or both of regenerating the draw stream from the diluted draw stream or circulating a marker in the draw stream including regenerating a concentration of the marker in the draw stream, such as via concentrating the diluted draw stream via RO.

In embodiments, regenerating the draw stream can include reducing a concentration of contaminants in the draw stream or diluted draw stream. Reducing the concentration of contaminants in the draw stream or diluted draw stream can be carried out contemporaneously with recovering the permeate from the diluted draw stream or thereafter. For example, reducing the concentration of contaminants in the draw stream or diluted draw stream can include removing at least a portion of the diluted draw stream or draw stream from the system while after recovering the permeate from the diluted draw stream. Removing at least a portion of the diluted draw stream or draw stream from the system can include removing any portion of the draw stream or diluted draw stream such as about 1% or more, about 1% to about 99%, about 1% to about 10%, about 5% to about 20%, about 20% to about 40%, about 30% to about 50%, or about 50% to about 80% of the draw stream or diluted draw stream. Removing at least a portion of the diluted draw stream or draw stream from the system can include removing a portion of the draw stream or diluted draw stream after a set duration, such as once an hour (of the day or of run time of the system), once a day, once a week, once a month, etc. Reducing a concentration of contaminants in the draw stream or diluted draw stream can include replacing at least a portion of the draw stream or diluted draw stream prior to recirculation of the regenerated draw stream through the second side of the system, such as adding any of the above amounts of draw solutes to the as-reduced portion of the draw stream or diluted draw stream (e.g., portion of the draw stream or diluted draw stream reduced by those amounts disclosed above). In embodiments, reducing a concentration of contaminants in the draw stream or diluted draw stream can include processing the draw stream or diluted draw stream in a process effective to at least partially reduce the concentration of contaminants therein, such as pasteurization, distillation, advanced oxidation, etc. Accordingly, the systems disclosed herein can include a decontamination apparatus (e.g., outlets and inlets designed to remove and replace draw stream or diluted draw stream; or pasteurization, distillation, advanced oxidation system, membrane filtration such as NF or UF, absorption of the contaminants or destruction or inoculation of the contaminants by exposure to oxidants, UV, high pressure, temperature or any similar methods and associated equipment) operably coupled thereto between the outlet of the first side and the inlet of the first side, such as prior to or after an RO element. For example, an additional draw stream source (not shown) can be operably coupled to the system 400 or 500, such as between the RO element 150 and the FO element 110, to add additional draw stream, draw solutes, or solvent into the system 400 or 500. The additional draw stream source can dilute the concentration of contaminants in the draw stream via addition of one or more substantially uncontaminated components of the draw stream.

In embodiments, the method 700 can include recirculating the regenerated draw stream (including any markers therein) through the at least one FO element. In embodiments, the draw stream may not be regenerated, but may be replaced with a new draw solution.

Figure 8:
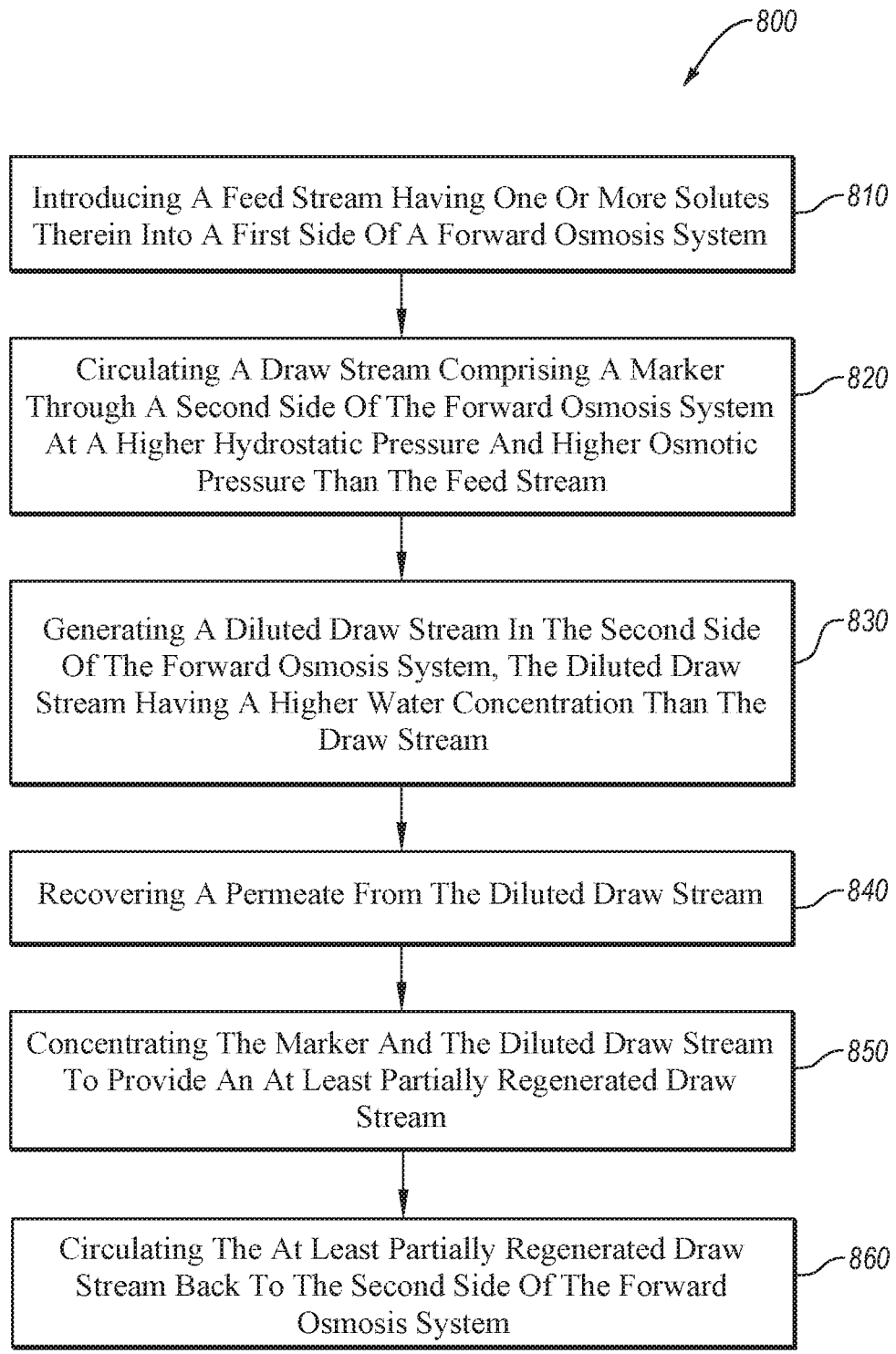
FIG. 8 is a flow diagram of a method for dewatering an alcoholic solution via forward osmosis, according to examples described herein.

FIG. 8 is a flow diagram of a method 800 for dewatering a feed stream via forward osmosis. The method 800 includes the acts: 810 introducing a feed stream having one or more solutes therein into a first side of a forward osmosis system; 820 circulating a draw stream comprising a marker through a second side of the forward osmosis system at a higher hydrostatic pressure and higher osmotic pressure than the feed stream; 830 generating a diluted draw stream in the second side of the forward osmosis system, the diluted draw stream having a higher water concentration than the draw stream; 840 recovering a permeate stream from the diluted draw stream; 850 concentrating the marker an the diluted draw stream to provide an at least partially regenerated draw stream; and 860 circulating the at least partially regenerated draw stream back to the second side of the FO system. The selected dewatering of the feed stream (without introducing contaminants into the draw stream and/or RO permeate) may be 80% by water volume or a concentration factor of five; less than 80% by water volume, such as about 50% water by volume, or about 25% water by volume; or greater than 80% by water volume, such as about 85% water by volume, or about 95% water by volume. The method 800 can be used to produce potable water and/or to concentrate a solution (e.g., on the feed side) by removing at least one solute or solvent, such as water, therefrom. The method 800 can be used to provide real-time monitoring of membrane integrity while retaining draw stream components for reuse.

In embodiments, 810 introducing a feed stream having one or more solutes therein into a first side of a FO system can be similar or identical to the act 710 described herein in one or more aspects. For example, introducing a feed stream having one or more solutes therein into a first side of a FO system can include introducing at least one of industrial or municipal wastewaters, produced waters, flowback waters, mine tailings, gray water, sewage, salt water, storm drain runoff, a beverage, or potable water, or any other water disclosed herein into the FO system. The feed stream my include any of the solutes disclosed herein such as at least one of a virus, a bacteria, a micro-organism, dirt, organic matter, a chemical, or a metal The act 820 circulating a draw stream comprising a marker through a second side of the FO system at a higher hydrostatic pressure and higher osmotic pressure than the feed stream can be similar or identical to the act 720 described herein in one or more aspects. For example, circulating a draw stream through a second side of the FO system at a higher osmotic pressure than the feed stream can include forming and/or using a draw stream having one or more draw components therein configured to produce a higher osmotic pressure in the draw stream than in the feed stream, such as inorganic solutes (e.g., salt(s)) or organic solutes (e.g., sugar, glycerol, PEG) in a concentration effective to induce any of the draw-to-feed osmotic pressure differentials disclosed herein. In an example, circulating a draw stream through a second side of the forward osmosis system at a higher hydrostatic pressure than the feed stream can include pressurizing a draw solution in a pump to deliver the draw stream to the second side at a specific hydrostatic pressure such as any of those disclosed herein (or to provide any of the draw-to-feed hydrostatic pressure differentials disclosed herein) such as at least 1 psi higher (e.g., 2 to 25 psi higher) than the feed stream. The higher hydrostatic pressure of the draw stream may be higher along an entire membrane area of the forward osmosis system. The higher hydrostatic pressure of the draw stream opposes flow of the feed stream through any breach in a membrane, seal, interface, or other component of the forward osmosis system. Circulating a draw stream comprising a marker through a second side of the FO system at a higher hydrostatic pressure and higher osmotic pressure than the feed stream can include using at least one of any of the markers disclosed herein in any of the concentrations disclosed herein (e.g., at least 1000 times higher than the minimum detectable concentration). Circulating a draw stream comprising a marker through a second side of the FO system at a higher hydrostatic pressure and higher osmotic pressure than the feed stream can include using a plurality of markers in the draw stream.

In embodiments, 830 generating a diluted draw stream in the second side of the FO system, the diluted draw stream having a higher water concentration than the draw stream can be similar or identical to the act 730 disclosed above, in one or more aspects. For example, the act 830 may include circulating the draw stream and the feed stream over an FO membrane such as any of the FO membranes disclosed herein and in any configuration disclosed herein. The FO membranes may be configured in a parallel or serpentine configuration (e.g., baffled). Generating a diluted draw stream in the second side of the FO system can include removing at least some water from the feed stream while retaining substantially all of the one or more solutes therein, via the at least one FO membrane. In embodiments, 830 generating a diluted draw stream in the second side of the FO system, the diluted draw stream having a higher water concentration than the draw stream can include generating a diluted draw stream having at least a 2-log reduction (e.g., 3-log, 4-log, or 5-log) in the one or more solutes over the feed stream. Generating the diluted draw stream can include removing at least some water from the feed stream while retaining substantially all of the one or more solutes therein, via a forward osmosis membrane. Generating a diluted draw stream can include removing at least some water from the feed stream while producing a feed concentrate with a higher one or more solutes concentration than the feed stream, via a forward osmosis membrane.

In embodiments, 840 recovering a permeate from the diluted draw stream can be similar or identical to recovering permeate as disclosed above with respect to method 700, in one or more aspects. For example, recovering a permeate stream from the diluted draw stream, can include recovering a permeate stream exhibiting at least a 2-log reduction in the concentration of at least one species (e.g., all species, only viruses, only pathogens, only bacteria, only small molecules, only large molecules, or combinations thereof) the one or more solutes over the feed stream. In embodiments, 840 recovering a permeate stream can include directing the diluted draw stream through at least one RO element. Directing the diluted draw stream through at least one RO element can include pressurizing the diluted draw stream to a pressure of at least about 2 psi (e.g., at least about 10, 50, or 100 psi), such as any of those RO pressures disclosed above with respect to claim 700. Pressurizing the diluted draw stream can be carried out using one or more pumps disposed between the outlet of the second side of the FO element and an inlet of the first side of the at least one RO element. The RO permeate may be potable water and the RO concentrate may be at least partially regenerated draw stream. In embodiments, the RO permeate can be distilled or subject to advanced oxidation to provide an additional barrier to the solutes in the final product (e.g., potable water). In such a manner the methods herein can be methods of providing potable water from a waste stream.

In embodiments, 850 concentrating the marker and the diluted draw stream to provide an at least partially regenerated draw stream can include circulating the diluted draw solution through at least one RO element. Circulating the diluted draw solution through at least one RO element can include producing an RO concentrate (e.g., the at least partially regenerated draw stream). The composition and concentration of the RO concentrate may be similar or identical to the draw stream. In embodiments, concentrating the marker and the diluted draw stream to provide an at least partially regenerated draw stream include adding one or more draw solutes to the RO concentrate. In embodiments, concentrating the marker and the diluted draw stream to provide an at least partially regenerated draw stream can include adding water to the RO concentrate. In embodiments, concentrating the marker and the diluted draw stream to provide an at least partially regenerated draw stream can include further treating the RO concentrate such as via additional RO processes, distillation, or FO. In embodiments, concentrating the marker and the diluted draw stream to provide an at least partially regenerated draw stream can be similar or identical to regenerating the draw stream as disclosed above with respect to method 700, in one or more aspects. For example, concentrating the marker and the diluted draw stream to provide an at least partially regenerated draw stream can include reducing the concentration of contaminants in the draw stream or diluted draw stream as disclosed above with respect to the method 700. In embodiments, reducing contaminants in the diluted draw stream may be carried out prior to circulating the at least partially regenerated draw stream back to the second side of the forward osmosis system. Reducing contaminants in the diluted draw stream may include any of the techniques disclosed herein. For example, reducing contaminants in the diluted draw stream may include adding additional draw stream or draw solutes to the diluted draw stream, the at least partially regenerated draw stream, or both.

The recovery methods herein (e.g., FO process and/or RO process(es)) may dewater the feed solution at ambient conditions without significantly altering or degrading the nutrients or components of the concentrate in some examples. Such dewatering may reduce transportation or disposal costs, increase stability and shelf life of products, and provide purified water for reuse. The methods and systems can also include acts and components to reconstitute the concentrated solutions via controlled addition of at least water thereto. The methods and systems can also include acts and components dispense the treated potable water for use.

In embodiments, 860 circulating the at least partially regenerated draw stream back to the second side of the FO system can include collecting the (at least partially regenerated) draw stream from the first side of the RO element and directing the (at least partially regenerated) draw stream to a pump (e.g., draw stream source) for pressurization for use in the at least one FO element. In embodiments, circulating the at least partially regenerated draw stream back to the second side of the FO system can include removing, replacing, or augmenting at least a portion of the (at least partially regenerated) draw stream. Replacing or augmenting at least a portion of the draw stream may include adding one or more of at least one marker, a draw stream solvent, or draw stream solute(s) to the (at least partially regenerated) draw stream. The method 800 can include sensing (e.g., detecting or monitoring) the presence or concentration of at least one the marker in the feed stream, feed concentrate, or an RO permeate. Sensing the presence or concentration of the at least one marker in the feed stream feed concentrate, or RO permeate can include using one or more sensors to detect the at least one marker. One or more sensors can be disposed in the first side, an outlet of the first side, a downstream component operably coupled to the first side (e.g., a conduit or a pump), or any other component of the systems disclosed herein (e.g., an outlet on the second side of an RO element). The one or more sensors can include any of the sensors disclosed herein. Sensing the presence of the at least one marker can include sensing/detecting the presence or concentration of the at least one marker via one or more of ultraviolet spectroscopy, fluorimetry, conductivity, or a selective ion probe. In embodiments, the at least one marker can include a plurality of markers and sensing the presence or concentration of at least one the marker can include sensing the presence or concentration of each of the plurality of markers, such as to provide redundancy in the system. In embodiments, the plurality of sensors can include a first group of sensors configured to detect the presence or concentration of a first type of the plurality of markers and the plurality of sensors can include at least a second group of sensors configured to detect the presence or concentration of at least a second type of the plurality of markers.

The method 800 can include selectively controlling such as by initiating, terminating or adjusting delivery (e.g., a flow rate or hydrostatic pressure) of one or more of the feed stream or the draw stream responsive to detecting a presence or concentration of the at least one marker in the draw stream (or a permeate stream). For example, flow of one or more of the feed stream or the draw stream may be terminated upon detection of the marker in the feed stream, feed concentrate, or RO permeate. Sensing the presence or concentration of the at least one marker in the feed stream feed concentrate, or RO permeate can include determining the size of a breach by determining a concentration of the at least one marker in one or more of the feed stream, feed concentrate, or RO permeate. Selectively controlling one or more of the feed stream or the draw stream can be responsive to detecting a leak over a threshold size or duration.

The method 800 can include sensing/detecting (e.g., monitoring) the one or more of the flow rate or the hydrostatic pressure of a stream (e.g., feed stream, draw stream, diluted draw stream, etc.) in one or more portions of the systems disclosed herein, such as along an entire membrane area of the FO system. For example, the method 800 can include continuously, intermittently, or instantaneously sensing or detecting hydrostatic pressure in the first side and the second side (e.g., along one or more portions of the entire surface area of the FO membrane) of the FO element to ensure that a positive draw-to-feed hydrostatic pressure differential is being maintained in the system. The method 800 can include initiating, terminating or adjusting delivery (e.g., a flow rate or hydrostatic pressure) of one or more of the feed stream, the draw stream, or the diluted draw stream responsive to detecting the flow rate or the hydrostatic pressure of the corresponding stream. For example, the controller can be configured to automatically terminate operation of the system or increase pressure applied by the draw stream source pump responsive to the one or more sensors detecting that the hydrostatic pressure in the feed side is equal to or higher than the draw side.

The method 800 can include controlling one or more of the hydrostatic pressure or flow rate of one or more of the draw stream, the diluted draw stream, or the feed stream with a controller. The controller can be similar or identical to the controller 170 in one or more aspects. Controlling one or more of the hydrostatic pressure or flow rate can be carried out automatically by the controller responsive to one or more sensor sensing (e.g., detecting) any of the marker(s) in the feed stream, feed concentrate, or RO permeate; the hydrostatic pressure of one or more streams in the system; or the flow rate of one or more streams in the system. In embodiments, the method 800 can include determining, with the controller, if the sensed information indicates a condition for initiating, terminating, or adjusting one or more of hydrostatic pressure or flow rates (e.g., shutting down flow) of the streams. Determining, with the controller, if the sensed information indicates a condition for initiating, terminating, or adjusting one or more of hydrostatic pressure or flow rates can include determining if the sensed data is over a threshold value for a concentration of marker(s) in the feed stream, feed concentrate, or RO permeate; a breach size or duration; or if a hydrostatic pressure or flow rate is above or below a threshold value for the same. The processor can determine if the sensed data is over a threshold value by comparing the sensed data to a look-up table or one or more preprogrammed threshold values stored in the memory storage medium.

In embodiments, the method 800 can include selectively deactivating, with the controller, pumps associated with an FO element, responsive to sensing a marker in the feed stream or feed concentrate of the FO element, effective to terminate the use of the FO element. In embodiments, the method 800 can include selectively deactivating, with the controller, one or more FO elements and associated pumps of a plurality of parallel FO elements, responsive to sensing a marker in the feed stream or feed concentrate of the corresponding FO element, effective to terminate the use of the corresponding FO element. In embodiments, the method 800 can include selectively closing, with the controller, one or more valves associated FO elements a plurality of parallel FO elements, responsive to sensing at least one marker in the feed stream or feed concentrate of the corresponding FO element, effective to isolate the corresponding FO element. In embodiments, the method 800 can include providing real-time updates of the presence or absence of a marker in the feed stream, feed concentrate, or RO permeate; or hydrostatic pressure or flow rate of one or more streams in the system; via a user interface operably coupled to the controller.

In embodiments, the method 700 or 800 can include producing a concentrated feed such as a juice, or other beverage concentrate. Producing a concentrated feed can include directing the concentrated feed to a storage, packaging, or other end-use site or medium.

The methods 700 and 800 can include any of the acts disclosed herein with respect to any of the figures.

Other specific forms of examples described herein may be used without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method, comprising:
    introducing a feed stream having one or more solutes therein into a first side of a forward osmosis system;
    circulating a draw stream through a second side of the forward osmosis system at a higher hydrostatic pressure and a higher osmotic pressure than the feed stream wherein a draw-to-feed osmotic pressure differential is at least 10 times higher than a draw-to-feed hydrostatic pressure differential;
    generating a diluted draw stream in the second side of the forward osmosis system, the diluted draw stream having a higher water concentration than the draw stream; and
    recovering a permeate from the diluted draw stream.

2. The method of claim 1 wherein the draw-to-feed osmotic pressure differential is at least 10 times higher than the draw-to-feed hydrostatic pressure differential along an entire membrane area of the forward osmosis system.

3. The method of claim 1, wherein circulating the draw stream through the second side of the forward osmosis system at the higher hydrostatic pressure than the feed stream includes circulating a marker in the draw stream.

4. The method of claim 3, wherein circulating the marker in the draw stream includes circulating the marker in a concentration at least 1000 times higher than a minimum detectable concentration of the marker.

5. The method of claim 3, further comprising monitoring the feed stream, a permeate stream, or both for the marker.

6. The method of claim 5, further comprising adjusting one or more of a flow rate or a hydrostatic pressure of one or more of the feed stream or the draw stream based on said monitoring of the feed stream, the permeate stream, or both for the marker.

7. The method of claim 6, wherein said adjusting comprises maintaining, increasing, decreasing, or terminating the flow rate of one or more of the feed stream or the draw stream responsive to detecting the marker in the feed stream, the permeate stream, or both.

8. The method of claim 6, wherein recovering the permeate from the diluted draw stream includes circulating the diluted draw stream through at least one reverse osmosis element to separate water from the diluted draw stream to at least partially regenerate the draw stream and recover the permeate.

9. A method, comprising:
    introducing a feed stream having one or more solutes therein into a first side of a forward osmosis system;
    circulating a draw stream comprising a marker through a second side of the forward osmosis system at a higher hydrostatic pressure and higher osmotic pressure than the feed stream wherein a draw-to-feed osmotic pressure differential is at least 10 times higher than a draw-to-feed hydrostatic pressure differential;
    generating a diluted draw stream in the second side of the forward osmosis system, the diluted draw stream having a higher water concentration than the draw stream;
    recovering a permeate from the diluted draw stream;
    concentrating the marker and the diluted draw stream to provide an at least partially regenerated draw stream; and
    circulating the at least partially regenerated draw stream back to the second side of the forward osmosis system.

10. The method of claim 9 wherein the higher hydrostatic pressure of the draw stream is higher along an entire membrane area of the forward osmosis system.

11. The method of claim 9, further comprising monitoring the higher hydrostatic pressure.

12. The method of claim 9, wherein circulating the draw stream through the second side of the forward osmosis system at the higher hydrostatic pressure than the feed stream includes circulating the draw stream through the second side at a draw stream pressure about 2 psi to about 25 psi higher than a feed stream pressure of the feed stream.

13. The method of claim 9, wherein recovering the permeate from the diluted draw stream includes producing a permeate stream from the diluted draw stream, the permeate stream including water having at least a 2-log reduction in a concentration of the one or more solutes over the feed stream.

14. A system, comprising:
    a forward osmosis system configured to receive a feed stream and a draw stream, the draw stream including a marker, the forward osmosis system further configured to produce a diluted draw stream;
    a concentration system configured to concentrate the diluted draw stream and the marker and at least partially regenerate the draw stream including the marker;
    a monitoring system positioned to monitor the feed stream, a permeate stream, or both for the marker; and
    a pressure regulation system, the pressure regulation system configured to maintain the draw stream at a higher hydrostatic pressure than the feed stream in the forward osmosis system, wherein the pressure regulation system is in communication with the monitoring system, and wherein the pressure regulation system is further configured to adjust one or more of a flow rate or a hydrostatic pressure of one or more of the feed stream or the draw stream based on feedback from the monitoring system.

15. The system of claim 14, wherein the pressure regulation system is configured to maintain the higher hydrostatic pressure of the draw stream along an entire membrane area of the forward osmosis system.

16. The system of claim 14, wherein the monitoring system includes a detector configured to perform spectroscopy, fluorimetry, measure conductivity, or utilize a selective ion probe.

17. The system of claim 16, wherein the pressure regulation system is further configured to adjust one or more of a flow rate or a hydrostatic pressure of one or more of the feed stream or the draw stream based on the monitoring system detecting one or more of a flow rate, hydrostatic pressure, or a concentration or presence of the at least one marker in the feed stream.

18. The system of claim 14, wherein the pressure regulation system is configured to adjust by maintaining, increasing, decreasing, or terminating a flow of one or more of the feed stream or the draw stream responsive to an indication from the monitoring system of the marker in the feed stream.

19. The system of claim 14, wherein the concentration system comprises at least one reverse osmosis element configured to separate water from the diluted draw stream to at least partially regenerate the draw stream and recover a permeate.

20. The system of claim 14, further comprising an additional draw stream source positioned to add additional draw stream to the diluted draw stream, the at least partially regenerated draw stream, or both, to reduce contaminant concentration in the at least partially regenerated draw stream.

21. The method of claim 3, wherein the marker includes one or more of fluorescein, methylene blue, pyrene, phthalocyanine, sulfate, fluoride, chloride, sodium, or rhodamine.

* * * * *